United States Patent
Goetz et al.

(10) Patent No.: US 6,583,223 B2
(45) Date of Patent: Jun. 24, 2003

(54) COATING COMPOSITIONS WHICH CONTAIN A LOW SURFACE TENSION (METH) ACRYLATE CONTAINING BLOCK COPOLYMER FLOW CONTROL AGENT

(75) Inventors: Jonathan D. Goetz, Sarver, PA (US); Kurt A. Humbert, Pittsburgh, PA (US); Karl F. Schimmel, Verona, PA (US); Karen A. Barkac, Murrysville, PA (US); Simion Coca, Pittsburgh, PA (US); Joanne H. Smith, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/965,547

(22) Filed: Sep. 27, 2001

(65) Prior Publication Data

US 2003/0100675 A1 May 29, 2003

(Under 37 CFR 1.47)

(51) Int. Cl.[7] .................................................. C08L 53/00
(52) U.S. Cl. ..................... 525/88; 525/92 R; 525/92 H; 525/93; 525/94
(58) Field of Search .................... 525/88, 92 R, 525/92 H, 93, 94

(56) References Cited

U.S. PATENT DOCUMENTS

| | | | |
|---|---|---|---|
| 3,407,247 A | 10/1968 | Reinhardt | 260/881 |
| 4,371,657 A | 2/1983 | Chang | 524/512 |
| 4,396,680 A | 8/1983 | Chang | 428/421 |
| 4,644,043 A | 2/1987 | Ohmori et al. | 526/246 |
| 4,665,144 A | 5/1987 | Ohmori et al. | 526/245 |
| 4,871,820 A | 10/1989 | Ohmori et al. | 426/245 |
| 5,026,621 A | 6/1991 | Tsubunko et al. | 430/109 |
| 5,049,622 A | 9/1991 | Abe | 525/267 |
| 5,283,148 A | 2/1994 | Rao | 430/114 |
| 5,397,669 A | 3/1995 | Rao | 430/108 |
| 5,478,886 A | 12/1995 | Kim | 525/94 |
| 5,597,874 A | 1/1997 | Anton et al. | 525/331.2 |
| 5,629,372 A | 5/1997 | Anton et al. | 524/507 |
| 5,705,276 A | 1/1998 | Anton et al. | 428/421 |
| 5,763,548 A | 6/1998 | Matyjaszewski et al. | 526/135 |
| 5,789,487 A | 8/1998 | Matyjaszewski et al. | 525/301 |
| 5,807,937 A | 9/1998 | Matyjaszewski et al. | 526/135 |
| 5,914,384 A | 6/1999 | Anton et al. | 528/83 |
| 5,948,851 A | 9/1999 | Anton et al. | 524/520 |
| 5,986,015 A | 11/1999 | Midha et al. | 525/370 |
| 6,197,883 B1 * | 3/2001 | Schimmel et al. | |

FOREIGN PATENT DOCUMENTS

WO    WO 98/40415    9/1998

* cited by examiner

Primary Examiner—Jeffrey Mullis
(74) Attorney, Agent, or Firm—William J. Uhl

(57) ABSTRACT

A thermosetting composition that includes a first reactant having functional groups; a second reactant having functional groups coreactive with the functional groups of the first reactant; and a block copolymer flow control agent. The block copolymer includes a first block made up of residues of a radically polymerizable fluoroalkyl(meth)acrylate monomer, a second block made up of residues of a second radically polymerizable ethylenically unsaturated monomer, and optionally a third block made up of residues of a third radically polymerizable ethylenically unsaturated monomer. The first, second and third blocks are made of different residues from each other and the block copolymer has a polydispersity index of less than 2.5. Also disclosed is a method of coating a substrate including the steps of applying the present thermosetting composition to the substrate; coalescing the thermosetting composition to form a substantially continuous film; and curing said thermosetting composition by the application of heat.

75 Claims, No Drawings

COATING COMPOSITIONS WHICH CONTAIN A LOW SURFACE TENSION (METH) ACRYLATE CONTAINING BLOCK COPOLYMER FLOW CONTROL AGENT

FIELD OF THE INVENTION

The present invention relates to thermosetting coating compositions containing flow control agents. Particularly, the invention relates to such compositions containing flow control agents that are low surface tension (meth)acrylate containing block (co)polymer compositions prepared in a controlled radical (co)polymerization process.

BACKGROUND OF THE INVENTION

Coating compositions, liquid and powder coatings for example, are used in a wide variety of applications, including for example, the automotive, appliance and industrial markets. Coatings are often used to provide decorative qualities and/or corrosion protection to the substrates over which they are applied. Correspondingly, applied coatings are typically required to have at least a continuous defect free surface. The automotive industry has particularly strict requirements as to the smoothness of the coatings that are used, as is the case with automotive clear topcoat compositions.

Coating compositions typically contain a flow control agent (also referred to as a flow modifier) to improve the appearance of the cured coating. Flow control agents have surface active properties and are thought to improve the appearance of a cured coating by altering the flow and leveling of the applied coating during its cure cycle. Flow control agents containing functional groups, such as carboxylic acid groups and/or hydroxyl groups, are known, and in addition to enhancing appearance, can also improve adhesion of the coating to the substrate over which it is applied, and/or improve the adhesion or compatibility of a subsequently applied coating.

Coating compositions are typically required to provide optimum properties, such as appearance and/or corrosion resistance, at a minimum film thickness. For example, in the automotive industry, clear topcoats are typically required to have cured film thickness of no greater than 50 microns (2 mils). Advantages associated with coatings applied at lower film thickness include, for example, reduced material costs and weight gain of the coated ware, which is particularly desirable in the aircraft industry. However, as the film build of an applied coating composition is decreased, the appearance of the resulting cured coating typically diminishes, for example, as evidence by lower measured gloss values.

In addition to the application of coatings at lower film builds, investigation and development in recent years has been directed toward reducing the environmental impact of coating compositions, in particular, the associated emissions into the air of volatile organics during their use. Accordingly, interest in coatings having lower volatile organic content (VOC), for example powder coatings and high solids coatings, has been increasing. Powder coating compositions are free flowing particulate compositions that are essentially free of solvents. The appearance of powder coatings typically degrades rather precipitously with decreasing film thickness, for example at film thickness less than 75 microns (3 mils), and in particular at film thickness less than 50 microns (2 mils). In the absence of solvents that can enhance the flow and leveling of an applied coating, a flow control agent is a critical component in the majority of powder coating compositions.

A wide variety of radically polymerizable monomers, such as methacrylate and acrylate monomers, are commercially available and can confer to a polymer or copolymer (hereinafter, collectively referred to as (co)polymer) produced therefrom a wide range of properties including, for example, hydrophilic and hydrophobic properties or the ability to interact with crosslinkers or to self crosslink. The use of conventional, i.e., non-living or free-radical (co)polymerization methods to synthesize (co)polymers provides little control over molecular weight, molecular weight distribution and, in particular, (co)polymer chain structure.

U.S. Pat. Nos. 5,807,937, 5,789,487 and 5,763,548, and International Patent Publication Nos. WO 98/40415, WO 98/01480, WO 97/18247 and WO 96/30421 describe a radical polymerization process referred to as atom transfer radical polymerization (ATRP). The ATRP process is described as being a living radical polymerization that results in the formation of polymers having predictable molecular weight and molecular weight distribution. The ATRP process also is described as providing highly uniform products having controlled structure (i.e., controllable topology, composition, etc.). The '937 and '548 patents also describe (co)polymers prepared by ATRP, which are useful in a wide variety of applications including, for example, dispersants and surfactants.

A number of initiators and macroinitiator systems are known to support ATRP polymerization. These initiators are described, for example, in U.S. Pat. Nos. 5,807,937 and 5,986,015. U.S. Pat. No. 5,807,937 discloses a number of initiators, including halide groups attached to a primary carbon. Halides attached to primary carbons are known as efficient initiators in ATRP processes. U.S. Pat. No. 5,986,015 discloses polymer macroinitiators prepared from vinyl chloride and another monomer, and their use in preparing graft (co)polymers with low polydispersity.

It also is desirable to have multiple initiation sites on an initiator in order to create unique branched (co)polymer structures, such as star (co)polymers. Such (co)polymers have a variety of practical applications, including as a resin component of a film-forming coating composition. These unique (co)polymers also will find use in the health care or cosmetics industries for instance, as materials for bioengineering. (Co)polymers of low polydispersity (Mw/Mn) are also desirable not only for their structural regularity and related usefulness in producing defined block and multi-block (co)polymer structures, but for their unique physical characteristics. For instance, a star (co)polymer having low polydispersity is a high molecular weight material having low viscosity in solution.

Fluorocarbon containing copolymers have been used as binding agents, wetting agents, surfactants and coatings in a variety of applications. Fluorocarbon containing copolymers made by conventional free radical polymerization methods have inevitable shortcomings as it is difficult to control their molecular weight distribution and composition in order to optimize the desired physical properties. For example, the common problem of poor control of molecular weight distribution can result in a high molecular weight "tail", which can give poor flow properties due to the high viscosity that results. Conversely, poor binding properties can result when too much of a low molecular weight "tail" is present.

U.S. Pat. Nos. 5,397,669 and 5,283,148 disclose an electrostatic liquid toner imaging process that uses a liquid toner comprised of a perfluorinated solvent and a polymer containing highly fluorinated units. The polymer was prepared using traditional free radical polymerization techniques and was characterized as having a polydispersity of 4.

U.S. Pat. No. 3,407,247 discloses fluoro olefin block copolymers prepared by traditional fee radical polymerization of a (meth)acrylic monomer to form a prepolymer which is subsequently reacted with a fluoro olefin. While block copolymers were formed to some extent, the resulting block copolymers inherently vary widely in block length and molecular weight leading to a wide compositional variation and distribution as well as a large polydispersity.

U.S. Pat. No. 5,026,621 discloses a toner for electrophotography which includes a block copolymer binder resin comprised of a fluoroalkyl acryl ester block and a fluorine-free vinyl or olefin monomer block. The block copolymers were made using a unique peroxypolyether initiator, which is then used to initiate a first free radical polymerization, forming a peroxypolymer, which initiates a second free radical polymerization. While block copolymers are formed, the resulting block copolymers inherently vary widely in block length and molecular weight leading to a wide compositional variation and distribution as well as a large polydispersity.

U.S. Pat. No. 5,478,886 discloses fluoroacrylate ester block copolymers prepared by group transfer polymerization techniques. The block copolymers have a polydispersity of less than 2 and does not contain any initiator residue. The disclosure is limited to fluoroacrylate monomers as the fluorocarbon monomer. These types of block copolymers are used, primarily in the electronics industry for photoresists. The block copolymers are particularly subject to photodegradation.

U.S. Pat. Nos. 5,629,372; 5,705,276; and 5,914,384 disclose coating compositions comprising an alkyl(meth) acrylate/fluoroalkyl methacrylate random copolymer and a crosslinking agent. The materials disclosed were suggested for use as clear coating compositions for application over a pigmented base coat.

It would be desirable to develop coating compositions, that have improved properties, such as coating appearance and minimal cratering, at lower film thickness, for example, film thickness less than or equal to 50 microns.

SUMMARY OF THE INVENTION

In accordance with the present invention, there is provided a thermosetting composition that includes:

a first reactant having functional groups;

a second reactant having functional groups that are coreactive with the functional groups of the first reactant; and a block copolymer flow control agent that includes a first block, which contains residues of a first radically polymerizable low surface tension (meth)acrylate monomer, a second block made up of residues of a second radically polymerizable ethylenically unsaturated monomer that is free of hydroxyl groups and amine groups, and optionally a third block made up of residues of a third radically polymerizable ethylenically unsaturated monomer that is free of hydroxyl groups and amine groups. The first, second and third blocks are made up of different residues from each other. The block copolymer is prepared by controlled radical polymerization and has a polydispersity index of less than 2.5.

The present invention is further directed to a method of coating a substrate using the present composition. The method includes the steps of applying the present thermosetting composition in the form of a co-reactable solid, particulate mixture to the substrate; coalescing the thermosetting composition to form a substantially continuous film; and curing the thermosetting composition by the application of heat.

DETAILED DESCRIPTION OF THE PREFERRED EMBODIMENTS

Other than in the operating examples, or where otherwise indicated, all numbers or expressions referring to quantities of ingredients, reaction conditions, etc, used in the specification and claims are to be understood as modified in all instances by the term "about".

Various numerical ranges are disclosed in this patent application. Because these ranges are continuous, they include every value between the minimum and maximum values. Unless expressly indicated otherwise, the various numerical ranges specified in this application are approximations.

The terms (meth)acrylic and (meth)acrylate are meant to include both acrylic and methacrylic acid derivatives, such as the corresponding alkyl esters often referred to as acrylates and (meth)acrylates, which the term (meth)acrylate is meant to encompass.

The block copolymer flow control agent of the present invention includes at least a first block of monomer residues and a second block of monomer residues. The first block includes residues of a first radically polymerizable low surface tension (meth)acrylate monomer. The second block is made up of residues of one or more second radically polymerizable ethylenically unsaturated monomers that are free of hydroxyl groups and amine group. Optionally, a third block made up of residues of one or more third radically polymerizable ethylenically unsaturated monomers that are free of hydroxyl groups and amine groups can be included in the block copolymer. The first, second and third blocks are made of different residues from each other.

Any low surface tension (meth)acrylate monomer can be used in the block copolymer flow control agent of the present invention, preferred low surface tension (meth) acrylate monomers are represented by formulas I and II,

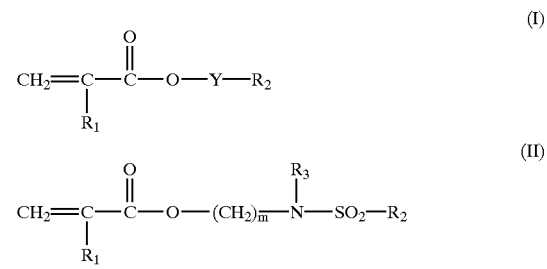

where $R_1$ is selected independently for each general formula from hydrogen, methyl and ethyl, $R_2$ is selected independently for each general formula from a fluorinated hydrocarbon group, a siloxane, a polysiloxane, an alkyl siloxane, an ethoxylated trimethylsilyl siloxane and a propoxylated trimethylsilyl siloxane. $R_2$ may contain from 4–20 carbon atoms, which can be linear, branched, cyclic, aryl or arylalkyl; Y is a divalent linking group containing from 1 to 20 carbon atoms and can be linear, branched, cyclic or aryl; m is an integer from 1 to 4; and $R_3$ is $C_1$–$C_4$ alkyl.

When the group, $R_2$ is a fluorinated alkyl group, it can be linear, branched or cyclic. The fluorinated hydrocarbon group $R_2$ can be described by general structure III:

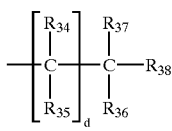

where $R_{34}$, $R_{35}$, $R_{36}$, $R_{37}$ and $R_{38}$ can each independently be H, F, $C_1$ to $C_6$ alkyl, as long as at least one occurrence of $R_{34}$, $R_{35}$, $R_{36}$, $R_{37}$ or $R_{38}$ is F; and d is an integer from 3 to 19.

Further, when the group $R_2$ is a fluorinated hydrocarbon group, it can be linear, branched, cyclic or aryl. When $R_2$ is a $C_1$–$C_{20}$ linear or branched alkyl group, one or more of the hydrogens are replaced with fluorine atoms. A non limiting example would be if $R_2$ were a propyl group, in which case it may be 3-fluoropropyl, 3,3-difluoropropyl, 3,3,3-trifluoropropyl, 1,2,3-trifluoropropyl, etc. When $R_2$ is a $C_1$–$C_{20}$ linear or branched cyclic group, one or more of the hydrogens are replaced with fluorine atoms. A non limiting example would be if $R_2$ were a cyclohexyl group, in which case it may be 3-fluorocyclohexyl, 3,3-difluorocyclohexyl, 1,2,3-trifluorocyclohexyl, 2,3,4,5-tetrafluorocyclohexyl, etc. When $R_2$ is a $C_1$–$C_{20}$ linear or branched aryl or arylalkyl group, one or more of the hydrogens are replaced with fluorine atoms. Non limiting examples of fluoroaryl and fuoroarylalkyl groups which can be part of the present flow control agent include those described by general structures IV–VII.

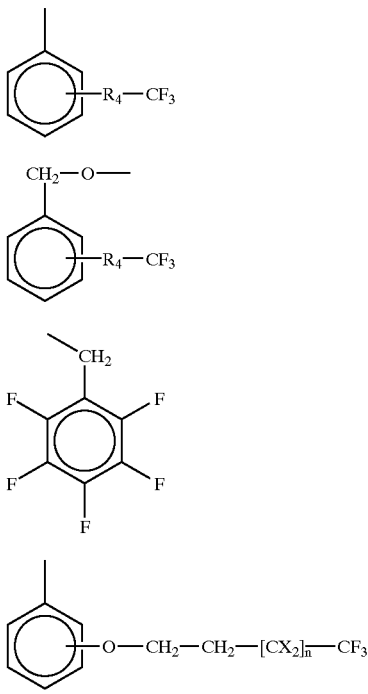

where $R_4$ is $C_1$–$C_4$ alkyl or alkynol, X is hydrogen or fluorine and n is an integer from 1 to 10.

Typically useful perfluoroalkyl containing monomers are perfluoro methyl ethyl methacrylate, perfluoro ethyl ethyl methacrylate, perfluoro butyl ethyl methacrylate, perfluoro pentyl ethyl methacrylate, perfluoro hexyl ethyl methacrylate, perfluoro octyl ethyl methacrylate, perfluoro decyl ethyl methacrylate, perfluoro lauryl ethyl methacrylate, perfluoro stearyl ethyl methacrylate, perfluoro methyl ethyl acrylate, perfluoro ethyl ethyl acrylate, perfluoro butyl ethyl acrylate, perfluoro pentyl ethyl acrylate, perfluoro hexyl ethyl acrylate, perfluoro octyl ethyl acrylate, perfluoro decyl ethyl acrylate, perfluoro lauryl ethyl acrylate, perfluoro stearyl ethyl acrylate, trifluoromethyl benzyl acrylate, trifluoromethyl benzyl methacrylate, 1,1,1-trifluoropropyl benzyl acrylate methacrylate, 1,1,1-trifluoropropyl benzyl methacrylate ethyleneglycol perfluorophenyl ether acrylate, ethyleneglycol perfluorophenyl ether methacrylate, 1,1,1,2,2,3,3,4,4,5,5,6,6,7,7,8,8-hexadecafluorodecyl benzyl ether acrylate, 1,1,1,2,2,3,3,4,4,5,5,6,6,7,7,8,8-hexadecafluorodecyl benzyl ether methacrylate, and the like. Preferred are perfluoro alkyl ethyl methacrylates wherein the fluoroalkyl group contains 4–20 carbon atoms and benzyl ether acrylates and methacrylates of Zonyl® FTS fluorotelomer intermediate, Zonyl® FTS is a commercially available $C_9$–$C_{10}$ partially fluorinated alcohol from DuPont.

When $R_2$ includes a siloxane, it may be described by the following general structure VIII:

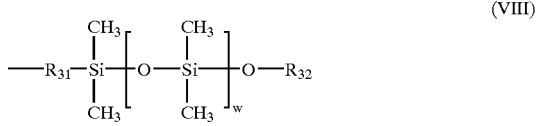

where $R_{31}$ is a linear, branched or cyclic $C_2$–$C_{18}$ alkyl or a polyether as in general formula IX:

where $R_{33}$ is a hydrogen, a halide or methyl and y is from 1 to 100, preferably from 1 to 50 and most preferably from 1 to 25 and $R_{32}$ is hydrogen, a linear, branched or cyclic $C_2$–$C_{18}$ alkyl or a trimethylsiloxane as in general structure X:

and w is from 0 to 500, preferably from 1 to 100 and most preferably from 1 to 50.

Typically useful siloxane containing low surface tension (meth)acrylates include, but are not limited to (meth)acryloxyalkyl terminated polydimethylsiloxanes, such as those available as MCR-M11 and MCR-M17 from Gelest, Inc., Tullytown, Pa. and X-22-174DX and X-22-2426 available as X-22-174DX from Shin-Etsu Chemical Co., Ltd., Tokyo, Japan; (meth)acryloxyalkyl tris(trimethylsiloxy silane), such as that available as X-22-174DX from Shin-Etsu Chemical Co.; and (meth)acryloxyalkyl trimethylsiloxy terminated polyethylene oxide such as that available as SIM0479.0 from Gelest, Inc.

In a preferred embodiment, the Tg value of the second block is at least 20° C., preferably 30° C. greater than the calculated Tg value of the low surface tension acrylate monomer containing block and/or the third block.

In the block copolymer flow control agent of the present invention, the first block contains the low surface tension (meth)acrylate monomer and the first block is present in an amount of up to 5 wt. %, preferably from 0.01 to 5 wt. %, more preferably from 0.1 wt. % to 5 wt. % and most preferably from 1 to 3 wt. % based on the total weight of the block copolymer flow control agent. The second block is present in an amount not less than 95 wt. %, preferably from 95 wt. % to 99.99 wt. %, more preferably from 95 wt. % to 99.9 wt. % and most preferably from 97 wt. % to 99 wt. % based on the total weight of the block copolymer flow control agent.

The third block is present in an amount of from 0 wt. % to 75 wt. %, preferably from 20 wt. % to 75 wt. % and most preferably from 35 wt. % to 65 wt. % based on the total weight of the block copolymer flow control agent. When the third block is present, the amount of each block will be from 0.01 to 5 wt. %, more preferably from 0.1 wt. % to 5 wt. % based and most preferably from 1 to 3 wt. % of the first low surface tension (meth)acrylate monomer containing block, from 25 wt. % to 75 wt. %, more preferably from 30 wt. % to 70 wt. % and most preferably from 35 wt. % to 65 wt. % of the second block, and from 20 wt. % to 74.99 wt. %, more preferably from 25 wt. % to 69.9 wt. % and most preferably from 32 wt. % to 64 wt. % of the third block based on the total weight of the block copolymer flow control agent.

Optionally, the second block and third block may include a minor amount of a hydroxyl functional monomer. By a minor amount, what is meant is that a monomer may be present in at least one of the second and third monomer blocks in an amount of from 0.01 wt. % to 5 wt. %, preferably from 0.05 wt. % to 4 wt. % and most preferably from 0.1 wt. % to 3 wt. % based on the total weight of the block. The hydroxy functional monomer may be present in the stated minor amounts.

The second radically polymerizable ethylenically unsaturated monomer and third radically polymerizable ethylenically unsaturated monomer can be any radically polymerizable alkylene containing a polar group. The preferred monomers are ethylenically unsaturated monomers and include monomers having general structure XI:

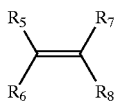

(XI)

wherein $R_5$, and $R_6$ are independently selected from the group consisting of H, halogen, CN, straight or branched alkyl of 1 to 20 carbon atoms (preferably from 1 to 6 carbon atoms, more preferably from 1 to 4 carbon atoms), aryl, unsaturated straight or branched alkenyl or alkynyl of 2 to 10 carbon atoms (preferably from 2 to 6 carbon atoms, more preferably from 2 to 4 carbon atoms), unsaturated straight or branched alkenyl of 2 to 6 carbon atoms (preferably vinyl) substituted (preferably at the α-position) with a halogen (preferably chlorine), $C_3$–$C_8$ cycloalkyl, heterocyclyl, phenyl which may optionally have from 1–5 substituents on the phenyl ring, C(=Y)$R_9$, C(=Y)NR$_{10}$R$_{11}$YCR$_{10}$, $R_{11}$, $R_{12}$ and YC(=Y)$R_{12}$, where Y may be NR$_{13}$ or O (preferably O), $R_9$ is alkyl of from 1 to 20 carbon atoms, alkoxy of from 1 to 20 carbon atoms, aryloxy or heterocyclyloxy, $R_{10}$ and $R_{11}$ are independently H or alkyl of from 1 to 20 carbon atoms, or $R_{10}$ and $R_{11}$ may be joined together to form an alkylene group of from 2 to 5 carbon atoms, thus forming a 3- to 6-membered ring, and $R_{12}$ is H, straight or branched $C_1$–$C_{20}$, alkyl and aryl; and $R_7$ is selected from the group consisting of H, halogen (preferably fluorine or chlorine), $C_1$–$C_6$ (preferably C1)alkyl, CN, COOR$_{14}$ (where $R_{14}$ is H, an alkali metal, or a $C_1$–$C_6$ alkyl group) or aryl; or $R_5$ and $R_7$ may be joined to form a group of the formula (CH$_2$)n, (which may be substituted with from 1 to 2n' halogen atoms or $C_1$–$C_4$ alkyl groups) or C(=O)—Y—C(=O), where n' is from 2 to 6 (preferably 3 or 4) and Y is as defined above; and $R_8$ is the same as $R_5$ or $R_6$ or optionally $R_8$ is a CN group; at least two of $R_5$, $R_6$, and $R_7$ are H or halogen.

Specific examples of ethylenically unsaturated monomers that may make up a block of the block copolymer flow control agent of the present invention include ethylenically unsaturated monomers, allylic monomers, olefins (meth)acrylic acid, (meth)acrylates, (meth)acrylamide, N- and N,N-di-substituted (meth)acrylamides, vinyl aromatic monomers, vinyl halides, vinyl esters of carboxylic acids and mixtures thereof. More specific examples of suitable monomers include, without limitation, $C_1$–$C_{20}$ alkyl(meth)acrylates (including linear or branched alkyls and cycloalkyls) which include, but are not limited to, methyl (meth)acrylate, ethyl(meth)acrylate, propyl(meth)acrylate, isopropyl(meth)acrylate, n-butyl(meth)acrylate, iso-butyl (meth)acrylate, tert-butyl(meth)acrylate, 2-ethylhexyl(meth) acrylate, lauryl(meth)acrylate, isobornyl(meth)acrylate, cyclohexyl(meth)acrylate, 3,3,5-trimethylcyclohexyl(meth) acrylate and isooctane(meth)acrylate; oxirane functional (meth)acrylates which include, but are not limited to, glycidyl(meth)acrylate, 3,4-epoxycyclohexylmethyl(meth) acrylate, and 2-(3,4-epoxycyclohexyl)ethyl(meth)acrylate; hydroxy alkyl(meth)acrylates having from 2 to 4 carbon atoms in the alkyl group which include, but are not limited to, hydroxyethyl(meth)acrylate, hydroxypropyl(meth) acrylate and hydroxybutyl(meth)acrylate. The residues may each independently be residues of monomers having more than one (meth)acryloyl group, such as (meth)acrylic anhydride, diethyleneglycol bis(meth)acrylate, 4,4'-isopropylidenediphenol bis(meth)acrylate (Bisphenol A di(meth)acrylate), alkoxylated 4,4'-isopropylidenediphenol bis(meth)acrylate, trimethylolpropane tris(meth)acrylate and alkoxylated trimethylolpropane tris(meth)acrylate.

In the context of the present application, the terms "alkyl", "alkenyl" and "alkynyl" refer to straight-chain or branched groups. Furthermore, in the present application, "aryl" refers to phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl and perylenyl (preferably phenyl and naphthyl), in which each hydrogen atom may be replaced with alkyl of from 1 to 20 carbon atoms (preferably from 1 to 6 carbon atoms and more preferably methyl), alkyl of from 1 to 20 carbon atoms (preferably from 1 to 6 carbon atoms and more preferably methyl) in which each of the hydrogen atoms is independently replaced by a halide (preferably a fluoride or a chloride), alkenyl of from 2 to 20 carbon atoms, alkynyl of from 1 to 20 carbon atoms, alkoxy of from 1 to 6 carbon atoms, alkylthio of from 1 to 6 carbon atoms, $C_3$–$C_8$ cycloalkyl, phenyl, halogen, NH2, $C_1$–$C_6$-alkylamino, $C_1$–$C_6$-dialkylamino, and phenyl which may be substituted with from 1 to 5 halogen atoms and/or C1–C4 alkyl groups. (This definition of "aryl" also applies to the aryl groups in "aryloxy" and "aralkyl.") Thus, phenyl may be substituted from 1 to 5 times and naphthyl may be substituted from 1 to 7 times (preferably, any aryl group, if substituted, is substituted from 1 to 3 times) with one of the above substituents. More preferably, "aryl" refers to phenyl, naphthyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl and tolyl.

Specific examples of vinyl aromatic monomers that may be used to prepare the (co)polymer include, but are not limited to, styrene, p-chloromethyl styrene, divinyl benzene, vinyl naphthalene and divinyl naphthalene. Vinyl halides that may be used to prepare the graft co(co)polymer include, but are not limited to, vinyl chloride, p-chloromethylstyrene, vinyl chloroacetate and vinylidene fluoride. Vinyl esters of carboxylic acids that may be used to prepare the (co) polymer include, but are not limited to, vinyl acetate, vinyl butyrate, vinyl 3,4-dimethoxybenzoate and vinyl benzoate.

In the context of the present invention, "heterocyclyl" refers to pyridyl, furyl, pyrrolyl, thienyl, imidazolyl, pyrazolyl, pyrazinyl, pyrimidinyl, pyridazinyl, pyranyl, indolyl, isoindolyl, indazolyl, benzofuryl, isobenzofuryl, benzothienyl, isobenzothienyl, chromenyl, xanthenyl, purinyl, pteridinyl, quinolyl, isoquinolyl, phthalazinyl, quinazolinyl, quinoxalinyl, naphthyridinyl, phenoxathiinyl, carbazolyl, cinnolinyl, phenanthridinyl, acridinyl, 1,10-phenanthrolinyl, phenazinyl, phenoxazinyl, phenothiazinyl, oxazolyl, thiazolyl, isoxazolyl, isothiazolyl, and hydrogenated forms thereof known to those in the art. Preferred heterocyclyl groups include pyridyl, furyl, pyrrolyl, thienyl, imidazolyl, pyrazolyl, pyrazinyl, pyrimidinyl, pyridazinyl, pyranyl and indolyl, the most preferred heterocyclyl group being pyridyl. Accordingly, suitable vinyl heterocycles to be used as a monomer in the present invention include 2-vinyl pyridine, 4-vinyl pyridine, 2-vinyl pyrrole, 3-vinyl pyrrole, 2-vinyl oxazole, 4-vinyl oxazole, 5-vinyl oxazole, 2-vinyl thiazole, 4-vinyl thiazole, 5-vinyl thiazole, 2-vinyl imidazole, 4-vinyl imidazole, 3-vinyl pyrazole, 4-vinyl pyrazole, 3-vinyl pyridazine, 4-vinyl pyridazine, 3-vinyl isoxazole, 3-vinyl isothiazoles, 2-vinyl pyrimidine, 4-vinyl pyrimidine, 5-vinyl pyrimidine, and any vinyl pyrazine, the most preferred being 2-vinyl pyridine. The vinyl heterocycles mentioned above may bear one or more (preferably 1 or 2) $C_1$–$C_6$ alkyl or alkoxy groups, cyano groups, ester groups or halogen atoms, either on the vinyl group or the heterocyclyl group, but preferably on the heterocyclyl group. Further, those vinyl heterocycles which, when unsubstituted, contain an N—H group which may be protected at that position with a conventional blocking or protecting group, such as a $C_1$–$C_6$ alkyl group, a tris-$C_1$–$C_6$ alkylsilyl group, an acyl group of the formula R15CO (where R15 is alkyl of from 1 to 20 carbon atoms, in which each of the hydrogen atoms may be independently replaced by halide, preferably fluoride or chloride), alkenyl of from 2 to 20 carbon atoms (preferably vinyl), alkynyl of from 2 to 10 carbon atoms (preferably acetylenyl), phenyl which may be substituted with from 1 to 5 halogen atoms or alkyl groups of from 1 to 4 carbon atoms, or aralkyl (aryl-substituted alkyl, in which the aryl group is phenyl or substituted phenyl and the alkyl group is from 1 to 6 carbon atoms), etc. (This definition of "heterocyclyl", also applies to the heterocyclyl groups in "heterocyclyloxy" and "heterocyclic ring.")

More specifically, preferred monomers include, but are not limited to, styrene, p-chloromethylstyrene, vinyl chloroacetate, acrylate and methacrylate esters of $C_1$–$C_{20}$ alcohols, isobutene, 2-(2-bromopropionoxy)ethyl acrylate, acrylonitrile, and methacrylonitrile.

As used herein and in the claims, by "allylic monomer(s)" is meant monomers containing substituted and/or unsubstituted allylic functionality, i.e., one or more radicals represented by the following general formula XII,

  (XII)

wherein $R_{16}$ is hydrogen, halogen or a $C_1$ to $C_4$ alkyl group. Most commonly, $R_1$ is hydrogen or methyl and consequently general formula XII represents the unsubstituted (meth)allyl radical. Examples of allylic monomers may each independently be residues of, but are not limited to, (meth)allyl ethers, such as methyl(meth)allyl ether and (meth)allyl glycidyl ether; allyl esters of carboxylic acids, such as (meth) allyl acetate, (meth)allyl butyrate, (meth)allyl 3,4-dimethoxybenzoate and (meth)allyl benzoate.

Other ethylenically unsaturated radically polymerizable monomers that may be used to prepare the block copolymer flow control agent include, but are not limited to: cyclic anhydrides, e.g., maleic anhydride, 1-cyclopentene-1,2-dicarboxylic anhydride and itaconic anhydride; esters of acids that are unsaturated but do not have α,β-ethylenic unsaturation, e.g., methyl ester of undecylenic acid; diesters of ethylenically unsaturated dibasic acids, e.g., di($C_1$–$C_4$ alkyl)ethyl maleates; maleimide and N-substituted maleimides.

In an embodiment of the present invention, the ethylenically unsaturated monomers include a hydrophobic residue of a monomer selected from oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof: $C_6$–$C_{20}$ alkyl(meth) acrylates, e.g., including those as previously recited herein; aromatic (meth)acrylates, e.g., phenyl(meth)acrylate, p-nitrophenyl(meth)acrylate and benzyl(meth)acrylate; polycyclicaromatic(meth)acrylates, e.g., 2-naphthyl(meth) acrylate; vinyl esters of carboxylic acids, e.g., hexanoic acid vinyl ester and decanoic acid vinyl ester; N,N-di($C_1$–$C_8$ alkyl)(meth)acrylamides; maleimide; N—($C_1$–$C_{20}$ alkyl) maleimides; N—($C_3$–$C_8$ cycloalkyl)maleimides; N-(aryl) maleimides; and mixtures thereof. Examples of N-substituted maleimides include, but are not limited to, N—($C_1$–$C_{20}$ linear or branched alkyl)maleimides, e.g., N-methyl maleimide, N-tertiary-butyl maleimide, N-octyl maleimide and N-icosane maleimide; N—($C_3$–$C_8$ cycloalkyl)maleimides, e.g., N-cyclohexyl maleimide; and N-(aryl)maleimides, e.g., N-phenyl maleimide, N—($C_1$–$C_9$ linear or branched alkyl substituted phenyl)maleimide, N-benzyl maleimide and N—($C_1$–$C_9$ linear or branched alkyl substituted benzyl)maleimide.

The oxirane functional monomer or its residue that is reacted with a carboxylic acid, may be selected from, for example, glycidyl(meth)acrylate, 3,4-epoxycyclohexylmethyl(meth)acrylate, 2-(3,4-epoxycyclohexyl)ethyl(meth)acrylate, allyl glycidyl ether and mixtures thereof. Examples of carboxylic acids that may be reacted with the oxirane functional monomer or its residue include, but are not limited to, para-nitrobenzoic acid, hexanoic acid, 2-ethyl hexanoic acid, decanoic acid, undecanoic acid and mixtures thereof.

The monomer containing at least one polar group may be present in an amount up to 5 wt % by weight based on the total amount of monomers. A preferred amount of the monomer containing at least one polar group is 0.01 to 5 wt %; the most preferred amount is 0.1 to 3 wt % based on the total amount of monomers.

In an alternative embodiment, the first block, containing residues of a first radically polymerizable low surface tension (meth)acrylate monomer may also contain the monomers of structure XI, described above. In this situation, the first block will contain from 0.1 to 99 wt. %, preferably from 1 to 90 wt. %, more preferably from 5 to 95 wt. % and most preferably from 10 to 90 wt. % of the low surface tension (meth)acrylate monomer and from 1 to 99.9 wt. %, preferably from 10 to 99 wt. %, more preferably from 5 to 95 wt. % and most preferably from 10 to 90 wt. % of one or more monomers of structure XI, described above, based on the total weight of the first block.

In this alternate arrangement of the block copolymer flow control agent of the present invention, the first block contains the low surface tension (meth)acrylate monomer as well as one or more monomers of structure XI and the first block is present in an amount from 25 wt. % to 75 wt. %, preferably from 30 wt. % to 70 wt. %, more preferably from 35 wt. % to 65 wt. % and most preferably from 40 wt. % to 60 wt. % based on the total weight of the block copolymer flow control agent. The second block is present in an amount from 25 wt. % to 75 wt. %, preferably from 30 wt. % to 70 wt. %, more preferably from 35 wt. % to 65 wt. % and most preferably from 40 wt. % to 60 wt. % based on the total weight of the block copolymer flow control agent.

The block copolymer flow control agent of the present invention is prepared by controlled radical polymerization. As used herein and in the claims, the term "controlled radical polymerization," and related terms, e.g., "living radical polymerization," refer to those methods of radical polymerization that provide control over the molecular weight, molecular weight distribution, polydispersity and polymer chain architecture. A controlled or living radical polymerization is also described as a chain-growth polymerization that propagates with essentially no chain transfer and essentially no chain termination. The number of living polymer chains formed during a controlled radical polymerization is often nearly equal to the number of initiators present at the beginning of the reaction. Each living polymer chain typically contains a residue of the initiator at what is commonly referred to as its tail, and a residue of the radically transferable group at what is commonly referred to as its head.

In an embodiment of the present invention, the block copolymer is prepared by atom transfer radical polymerization (ATRP). The ATRP process comprises: (co) polymerizing one or more ethylenically unsaturated polymerizable monomers in the presence of a specific initiation system; forming a (co)polymer; and isolating the formed (co)polymer.

In preparing the block copolymer of the present invention by ATRP, the initiator may be selected from linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable group, which is typically a halo group. The initiator may also be substituted with functional groups such as oxyranyl groups, which include glycidyl groups. Additional useful initiators and the various radically transferable groups that may be associated with them (cyano, cyanato, thiocyanato, and azide groups for example) are described in U.S. Pat. No. 5,807,937 at column 17, line 4 through column 18 line 28.

Polymeric compounds (including oligomeric compounds) having radically transferable groups may be used as ATRP initiators, and are herein referred to as "macroinitiators". Examples of Macroinitiators include, but are not limited to polystyrene prepared by cationic polymerization and having a terminal halide (chloride for example), and a polymer of 2-(2-bromopropionoxy)ethyl acrylate and one or more alkyl (meth)acrylates(butyl acrylate for example) prepared by conventional non-living radical polymerization.

Macroinitiators can be used in the ATRP process to prepare graft polymers, such as grafted block copolymers and comb copolymers. A further discussion of macroinitiators is found in U.S. Pat. No. 5,789,487 at column 13, line 27 through column 18, line 58.

Preferably, the ATRP initiator may be selected from the halomethane, methylenedihalide, haloform, carbon tetrachloride, 1-halo-2,3-epoxypropane, methanesulfonyl halide, p-toluenesulfonyl halide, methanesulfenyl halide, p-toluensulfenyl halide, 1-phenylethyl halide, C1–C6-alkyl ester of 2-halo-C1–C6-carboxylic acid, p-halomethylstyrene, monohexakis(α-halo-C1–C6-alkyl) benzene, diethyl-2-halo-2-methyl malonate and mixtures thereof. Particularly preferred ATRP initiators are diethyl-2-bromo-2-methyl malonate and p-toluenesufonyl chloride.

Although the prior art teaches the specific use of halogenated hydrocarbons as preferred initiators for ATRP processes, it has been found as part of the present invention that when fluorocarbon ester (meth)acrylates are used, the C—F bond is too strong and the fluorine atoms, although halogens, do not participate as radically transferable groups in the ATRP process. These monomers are further distinguished from other halogenated monomers in their resistance to photodegradation.

Catalysts that may be used in the ATRP preparation of the (co)polymer of the present invention, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following formula (XIII), $$TM_n + X_n \qquad (XIII)$$

where TM is the transition metal, n is the formal charge on the transition metal having a value of from 0 to 7, and X is a counterion or covalently bonded component. Examples of the transition metal include, but are not limited to, Cu, Fe, Au, Ag, Hg, Pd, Pt, Co, Mn, Ru, Mo, Nb and Zn. Examples of X include, but are not limited to, halide, hydroxy, oxygen, C1–C6-alkoxy, cyano, cyanato, thiocyanato and azido. A preferred transition metal is Cu(I) and X is preferably halide, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, Cu(II)Cl2 when Cu(I)Cl is used. Additional catalysts useful in preparing the block copolymer flow control agent are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the (co)polymer, include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to: unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl(meth)acrylates. As used herein and in the claims, the term "(meth)acrylate" and similar terms refer to acrylates, methacrylates, and mixtures of acrylates and methacrylates. A preferred class of ligands are the substituted bipyridines, e.g., 4,4'-dialkyl-bipyridyls. Additional ligands that may be used in preparing the (co)polymer are described in U.S. Pat. No. 5,807,937 at column 18, line 57 through column 21, line 43.

The initiator includes one or more halide-containing initiation sites that are primarily connected by aliphatic carbons. The connecting aliphatic carbons may include aromatic residues. However, to avoid susceptibility to UV degradation, aromatic moieties are generally avoided. The avoidance of aromatic moieties also isolates each. Typically the connecting carbons are aliphatic (free from aromatic moieties). The initiator sites are also preferably "symmetrical". By "symmetrical" it is meant that the $K_i$ (initiation constant) for each initiation site and typically the $K_p$ (propagation constant) is substantially the same. By "isolated" it is meant that the $K_i$ and $K_p$ for each initiation site is not affected substantially by the initiation and propagation of polymerization on a second initiation site on the same initiator.

In preparing the block copolymer flow control agent by ATRP methods, the molar ratio of transition metal compound to initiator is typically in the range of $10^{-4}:1$ to $10:1$, for example, $0.1:1$ to $5:1$. The molar ratio of ligand to transition metal compound is typically within the range of $0.1:1$ to $100:1$, for example, $0.2:1$ to $10:1$.

The block copolymer flow control agent may be prepared in the absence of solvent, i.e., by means of a bulk polymerization process. Generally, the block copolymer flow control agent is prepared in the presence of a solvent, typically an organic solvent. Classes of useful organic solvents include, but are not limited to, esters of carboxylic acids, ethers, cyclic ethers, $C_5$–$C_{10}$ alkanes, $C_5$–$C_8$ cycloalkanes, aromatic hydrocarbon solvents, amides, nitriles, sulfoxides, sulfones and mixtures thereof. Supercritical solvents, such as $CO_2$, $C_1$–$C_4$ alkanes and fluorocarbons, may also be employed. A preferred class of solvents are the aromatic hydrocarbon solvents, particularly preferred examples of which are xylene, toluene, and mixed aromatic solvents such as those commercially available from Exxon Chemical America under the trademark SOLVESSO. Additional solvents are described in further detail in U.S. Pat. No. 5,807,937 at column 21, line 44 through column 22, line 54.

The ATRP preparation of the block copolymer flow control agent is typically conducted at a reaction temperature within the range of 25° C. to 140° C., preferably from 50° C. to 100° C., and a pressure within the range of 1 to 100 atmospheres, usually at ambient pressure. The atom transfer radical (co)polymerization is typically completed in less than 24 hours, preferably between 1 and 8 hours.

The ATRP transition metal catalyst and its associated ligand are typically separated or removed from the (co) polymer product prior to its use. Removal of the ATRP catalyst may be achieved using known methods, including, for example, adding a catalyst binding agent to the a mixture of the block copolymer flow control agent, solvent and catalyst, followed by filtering. Examples of suitable catalyst binding agents include, for example, alumina, silica, clay or a combination thereof. A mixture of the block copolymer flow control agent, solvent and ATRP catalyst may be passed through a bed of catalyst binding agent. Alternatively, the ATRP catalyst may be oxidized in situ, the oxidized residue of the catalyst being retained in the block copolymer flow control agent.

The block copolymer flow control agents of the present invention include a variety of structures, depending upon the structure of the initiator, the monomers used in propagating the copolymer, the reaction conditions and the method of termination of the polymerization process. The block copolymer flow control agents of the present invention typically have star-like structures when the block copolymers are produced by propagating a polymer chain on the above-described poly-functional initiator (three or more initiation sites). Linear block copolymers can be prepared through the use of di-functional initiators.

The initiators may include active hydrogen-containing groups to permit crosslinking of the initiator by known crosslinking methods. The initiator may include other functionality, such as an ionic group or a group that can be converted into an ionic group, such as a quaternary amine group or a sulfonium group. An ionic group-containing block copolymer prepared in such a manner can be useful as a component of an electrodepositable film-forming composition for use in preparing a coating layer on an electroconductive substrate. The initiator may further contain an active group that permits grafting of other groups to the block copolymer, such as polymer chains that cannot be prepared by a controlled radical polymerization process. An example of such a chain is a polyoxyalkylene chain, which may be useful in solubilizing the block copolymer, depending upon the intended use for the block copolymer.

The choice of monomers used in preparing the block copolymer flow control agent also is an important factor in determining the structure of the block copolymer. Block (co)polymers can be produced by chain propagation with a sequence of different monomers. The use of hydrophilic monomers (i.e., an poly(alkylene glycol)(meth)acrylate or hydrophobic monomers, i.e. an alkyl(meth)acrylate, will dictate the hydrophobicity and hydrophilicity of defined portions of the block copolymer structure. The use of active hydrogen-containing monomers, i.e., a hydroxyalkyl(meth) acrylate, or a (meth)acrylamide, will dictate the reactivity of portions of the (co)polymer to crosslinkers and/or other co-reactive group-containing materials.

As described above, the block copolymer flow control agent may have nonionic moieties, ionic moieties and combinations thereof. In an embodiment of the present invention, the ethylenically unsaturated monomers can be selected from, for example, poly(alkylene glycol)(meth) acrylates; $C_1$–$C_4$ alkoxy poly(alkylene glycol)(meth) acrylates; hydroxyalkyl(meth)acrylates having from 2 to 4 carbon atoms in the alkyl group; N-(hydroxy $C_1$–$C_4$ alkyl) (meth)acrylamides, e.g., N-hydroxymethyl(meth) acrylamide and N-(2-hydroxyethyl)(meth)acrylamide; N,N-di-(hydroxy $C_1$–$C_4$ alkyl)(meth)acrylamides (e.g., N,N-di (2-hydroxyethyl)(meth)acrylamide); carboxylic acid functional monomers; salts of carboxylic acid functional monomers; amine functional monomers; salts of amine functional monomers; and mixtures thereof.

Poly(alkylene glycol)(meth)acrylates and $C_1$–$C_4$ alkoxy poly(alkylene glycol)(meth)acrylates are prepared by known methods. For example, (meth)acrylic acid or hydroxyalkyl (meth)acrylate, e.g., 2-hydroxyethyl(meth)acrylate, may be reacted with one or more alkylene oxides, e.g., ethylene oxide, propylene oxide and butylene oxide. Alternatively, an alkyl(meth)acrylate may be transesterified with a $C_1$–$C_4$ alkoxy poly(alkylene glycol), e.g., methoxy poly(ethylene glycol). Examples of poly(alkylene glycol)(meth)acrylates and $C_1$–$C_4$ alkoxy poly(alkylene glycol)(meth)acrylates include, poly(ethylene glycol)(meth)acrylate and methoxy poly(ethylene glycol)(meth)acrylate, the poly(ethylene glycol) moiety of each having a molecular weight of from 100 to 800. An example of a commercially available $C_1$–$C_4$ alkoxy poly(alkylene glycol)(meth)acrylate is methoxy poly (ethylene glycol) 550 methacrylate monomer from Sartomer Company, Inc. Preferred hydroxy functional monomer are hydroxyalkyl(meth)acrylates having from 2 to 20 carbon atoms in the alkyl group; epoxide functional ethylenically unsaturated radically polymerizable monomers, which are hydrolyzed; hydroxyalkyl(meth)acrylates having from 2 to 20 carbon atoms in the alkyl group, which are reacted with a lactone; beta-hydroxy ester functional (meth)acrylates, which are the reaction product of (i) (meth)acrylic acid and a glycidyl ester of a saturated monocarboxylic acid having from 4 to 26 carbon atoms, or (ii) glycidyl(meth)acrylate and a saturated monocarboxylic acid having from 4 to 26 carbon atoms; and mixtures thereof.

Examples of carboxylic acid functional ethylenically unsaturated monomers include, but are not limited to, (meth)acrylic acid, maleic acid, and fumaric acid. The monomer may be a residue of a precursor of a carboxylic acid functional monomer that is converted to a carboxylic acid residue after completion of the controlled radical (co) polymerization, e.g., maleic anhydride, di($C_1$–$C_4$ alkyl) maleates and $C_1$–$C_4$ alkyl(meth)acrylates. For example, residues of maleic anhydride can be converted to diacid residues, ester/acid residues or amide/acid residues by art-recognized methods. Residues of $C_1$–$C_4$ alkyl(meth)acrylates, such as t-butyl methacrylate, can be converted to (meth)acrylic acid residues by art-recognized methods. Salts of carboxylic acid functional monomers include, for example, salts of (meth)acrylic acid and primary, secondary or tertiary amines, such as, butyl amine, dimethyl amine and triethyl amine.

Amine functional monomers include, for example, amino (C2–C4 alkyl)(meth)acrylates, e.g., 2-aminoethyl(meth)acrylate, 3-aminopropyl(meth)acrylate and 4-aminobutyl (meth)acrylate; N—($C_1$–$C_4$ alkyl)amino($C_2$–$C_4$ alkyl)(meth)acrylates, e.g., N-methyl-2-aminoethyl(meth)acrylate; N,N-di($C_1$–$C_4$ alkyl)amino($C_2$–$C_4$ alkyl)(meth)acrylates, e.g., N,N-dimethyl-2-aminoethyl(meth)acrylate; and N,N-di($C_1$–$C_4$ alkyl)aminoethyl(meth)acrylates. The monomer may also comprise residues of salts of amine functional monomers, e.g., salts of those amine functional monomers as recited previously herein. Salts of the amine functional monomer residues may be formed by mixing a carboxylic acid, e.g., lactic acid, with the (co)polymer after completion of controlled radical (co) polymerization.

In an embodiment of the present invention, the block copolymer flow control agent can contain a segment that includes carboxylic acid functional monomers selected from (meth)acrylic acid, maleic anhydride, maleic acid, di(C1–C4 alkyl)maleates, and mixtures thereof. In a still further embodiment of the present invention, the (co)polymer segment is a residue of amine functional monomers selected from amino($C_2$–$C_4$ alkyl)(meth)acrylates, N—($C_1$–$C_4$ alkyl)amino($C_2$–$C_4$ alkyl)(meth)acrylates, N,N-di($C_1$–$C_4$ alkyl)amino($C_2$–$C_4$ alkyl)(meth)acrylates and mixtures thereof.

The block copolymer flow control agent also may contain a segment that contains cationic moieties selected from ammonium, sulphonium and phosphonium. Ammonium, sulphonium and phosphonium moieties may be introduced into the block copolymer flow control agent by means known to the skilled artisan. For example, when the block copolymer flow control agent contains a residue of N,N-dimethyl-2-aminoethyl(meth)acrylate, the N,N-dimethylamino moieties may be converted to ammonium moieties by mixing an acid, e.g., lactic acid, with the polymer.

When the segment of the block copolymer flow control agent contains residues of oxirane functional monomers, such as glycidyl(meth)acrylate, the oxirane groups may be used to introduce sulphonium or phosphonium moieties into the polymer. Sulphonium moieties may be introduced into the polymer by reaction of the oxirane groups with thiodiethanol in the presence of an acid, such as lactic acid. Reaction of the oxirane groups with a phosphine, e.g., triphenyl phosphine or tributyl phosphine, in the presence of an acid, such as lactic acid, results in the introduction of phosphonium moieties into the graft (co)polymer.

The block copolymer flow control agent can have two or more segments. In a two-segment block copolymer, the copolymer may have the general formula XIV:

  (XIV)

where each of A and B in general formula XIV may represent one or more types of monomer residues, while p and s represent the average total number of A and B residues occurring per block or segment of A residues (A-block or A-segment) and B residues (B-block or B-segment), respectively, t is an integer greater than one and refers to the number of initiator sites present on the initiator, φ is the residue from the initiator and X is a halide. When containing more than one type or species of monomer residue, the A- and B-blocks may each have at least one of block, e.g., di-block and tri-block and alternating architectures. For purposes of illustration, an A-block containing 6 residues of methyl methacrylate (MMA) and 6 residues of 2-ethylhexylmethacrylate (2EHM), for which p is 12, may have di-block, tetra-block, alternating and gradient architectures as represented in general formulas XV to XVIII.

(XV) Di-Block Architecture

(XVI) Tetra-Block Architecture

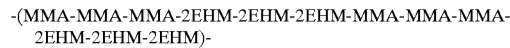

(XVII) Alternating Architecture

(XVIII) Gradient Architecture

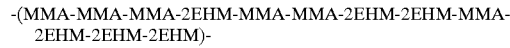

The B-block may be described in a manner similar to that of the A-block.

The order in which monomer residues occur along the backbone of the block copolymer typically is determined by the order in which the corresponding monomers are fed into the vessel in which the controlled radical polymerization is conducted. For example, the monomers that are incorporated as residues in the A-block of the block copolymer are generally fed into the reaction vessel prior to those monomers that are incorporated as residues in the B-block.

During formation of the A- and B-blocks, if more than one monomer is fed into the reaction vessel at a time, the relative reactivities of the monomers typically determines the order in which they are incorporated into the living polymer chain. Gradient sequences of monomer residues within the A- and B-blocks can be prepared by controlled radical polymerization, and in particular by ATRP methods by (a) varying the ratio of monomers fed to the reaction medium during the course of the polymerization, (b) using a monomer feed containing monomers having different rates of polymerization, or (c) a combination of (a) and (b). Copolymers containing gradient architecture are described in further detail in U.S. Pat. No. 5,807,937 at column 29, line 29 through column 31, line 35.

Subscripts p and s represent average numbers of residues occurring in the respective A- and B-blocks. Typically, subscript s has a value of at least 1, and preferably at least 5 for general formula XIV. Also, subscript s has a value of typically less than 300, preferably less than 100, more preferably less than 50, and most preferably 20 or less, for general formula XIV. Further, s may be a number from 1 to 100. In addition to the ranges described above, s can range from 1 to 20, preferably from 1 to 15, more preferably from 1 to 10 and most preferably from 2 to 8. The value of subscript s may range between any combination of these values, inclusive of the recited values.

Subscript p may have a value of at least 1, and preferably at least 5. Subscript p also typically has a value of less than 300, preferably less than 100, more preferably less than 50, and most preferably 20 or less. Further, p may be a number from 1 to 50. In addition to the ranges described above, p can range from 1 to 20, preferably from 1 to 15, more preferably from 1 to 10 and most preferably from 2 to 8. The value of subscript p may range between any combination of these values, inclusive of the recited values.

The block copolymer flow control agent typically has a number average molecular weight (Mn) of from 500 to 100,000, preferably from 1,000 to 50,000 and most preferably from 5,000 to 20,000, as determined by gel permeation chromatography using polystyrene standards. The polydispersity index, i.e., weight average molecular weight (Mw) divided by the number average molecular weight (Mn) of the block copolymer typically are less than 2.0, preferably less than 1.8 and most preferably less than 1.5. When the number average molecular weight of the flow control agent is above 100,000, the flow of the coating composition is inhibited. When the molecular weight of the flow control additive is below 500, there is no control of the flow of the coating composition.

Symbol φ of general formula X is or is derived from the residue of the initiator used in the preparation of the block copolymer by controlled radical polymerization, and is free of the radically transferable group of the initiator. In the process of the present invention, the radically transferable group is a halide group, preferably a bromide group. The halide residue may be (a) left on the block copolymer, (b) removed or (c) chemically converted to another moiety. The radically transferable group may be removed by substitution with a nucleophilic compound, e.g., an alkali metal alkoxylate. Graft-group-terminal halogens can be removed from the block copolymer flow control agent by means of a mild dehalogenation reaction. The reaction is typically performed as a post-reaction after the graft (co)polymer has been formed, and in the presence of at least an ATRP catalyst. Preferably, the dehalogenation post-reaction is performed in the presence of both an ATRP catalyst and its associated ligand.

The block copolymer flow control agents of the present invention can be used without limitation, in film-forming compositions, as rheology modifiers, with pigment or ink dispersants, in gel matrices and with molding resins.

The block copolymer flow control agent of the present invention may be further described as containing at least one of the following representative polymer chain structures XIX and XX:

   (XIX)

   (XX)

wherein L is a residue of at least one low surface tension (meth)acrylate monomer as defined above and M is a residue of at least one second radically polymerizable ethylenically unsaturated monomer that is free of hydroxyl or amine groups. The block, L, may contain other monomers described by structure XI, in addition to the low surface tension (meth)acrylate monomer. Preferably, the calculated Tg of residue M is 20° C., more preferably 30° C. greater than the calculated Tg of monomer residues in block L. The values of s and p are as defined above. In polymer chain structures XIX and XX, residue M may optionally be residues of a minor amount of hydroxy or amine functional ethylenically unsaturated radically polymerizable monomer as described above.

As stated previously, when the block copolymer flow control agent of the present invention is made using ATRP, it will contain a residue from the initiator, φ. Depending on the number of radically transferable groups on the initiator, the location of initiator residue φ will vary. When one radically transferable group is present, structures XXI and XXII can result. When two radically transferable groups are present, structures XXIII and XXIV can result.

   (XXI)

   (XXII)

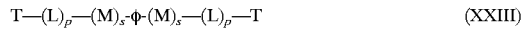   (XXIII)

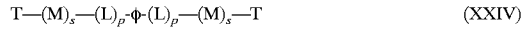   (XXIV)

in which φ is or is derived from the residue of the initiator free of radically transferable groups and T is or is derived from the radically transferable group of the initiator. M, L, s and p are as defined above.

The block copolymer flow control agent of the present invention may be additionally described as containing at least one of the following representative polymer chain structures XXV–XXX:

   (XXV)

   (XXVI)

   (XXVII)

   (XXVIII)

   (XXIX)

   (XXX)

in which E is at least one third radically polymerizable ethylenically unsaturated monomer that is free of hydroxyl groups and amine groups. The monomer represented by E is different than the first and second radically polymerizable ethylenically unsaturated monomers. The integers s and p are as defined above and the integer q represents average numbers of residues occurring in a block of residues; and q is independently 0, 1, an integer greater than 1 and can be from 1 to 100, preferably 1 to 60 and more preferably 1 to 30 for each structure. In addition to the ranges described above, q can range from 0 to 20, preferably from 1 to 15, more preferably from 1 to 10 and most preferably from 2 to 8. The value of subscript q may range between any combination of these values, inclusive of the recited values.

Preferably, the calculated Tg of residue M is 20° C., more preferably 30° C. greater than the calculated Tg of monomer residues in block E. In this preferred embodiment, structure XXV is preferred as it provides a flow control agent with a compositional gradient that provides superior coating surface properties.

When the block copolymer flow control agent of the present invention is prepared by ATRP in the presence of an initiator having a radically transferable group, the block copolymer flow control agent may be further described as having at least one of the following structures XXXI–XXXVI:

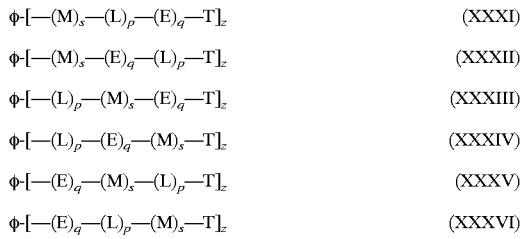

$\phi$-[—(M)$_s$—(L)$_p$—(E)$_q$—T]$_z$ (XXXI)

$\phi$-[—(M)$_s$—(E)$_q$—(L)$_p$—T]$_z$ (XXXII)

$\phi$-[—(L)$_p$—(M)$_s$—(E)$_q$—T]$_z$ (XXXIII)

$\phi$-[—(L)$_p$—(E)$_q$—(M)$_s$—T]$_z$ (XXXIV)

$\phi$-[—(E)$_q$—(M)$_s$—(L)$_p$—T]$_z$ (XXXV)

$\phi$-[—(E)$_q$—(L)$_p$—(M)$_s$—T]$_z$ (XXXVI)

in which $\phi$ is or is derived from the residue of the initiator free of radically transferable groups; T is or is derived from the radically transferable group of the initiator; z is at least equal to the number of radically transferable groups (T) of the initiator and is independently for each structure at least 1, an integer greater than 1, for example from 1 to 100, preferably from 1 to 50, more preferably from 1 to 10 and most preferably from 1 to 5. When the present block copolymer flow control additive has a star, core-arm or comb type architecture, z is 2 or more and may be from 2 to 10 and in some cases will be from 3 to 8. The value of subscript z may range between any combination of these values, inclusive of the recited values.

Preferably, the calculated Tg of residue M is 20° C., more preferably 30° C. greater than the calculated Tg of monomer residues in block E; s, p and q are as defined above.

With reference to polymer chain structures XXXI–XXXVI, each of M and E are optionally and independently also residues having a minor amount of at least one hydroxy functional ethylenically unsaturated radically polymerizable monomer, such as hydroxypropyl(meth) acrylate. The hydroxy functional ethylenically unsaturated radically polymerizable monomer is as described previously herein.

Symbol T of general formulas XXXI–XXXVI is or is derived from the radically transferable group of the initiator. For example, when the block copolymer is prepared in the presence of diethyl-2-bromo-2-methyl malonate, T may be the radically transferable bromo group.

The radically transferable group may optionally be (a) removed or (b) chemically converted to another moiety. In either of (a) or (b), the symbol T is considered herein to be derived from the radically transferable group of the initiator. The radically transferable group may be removed by substitution with a nucleophilic compound, such as an alkali metal alkoxylate. However, in the present invention, it is desirable that the method by which the radically transferable group is either removed or chemically converted also be relatively mild.

In an embodiment of the present invention, when the radically transferable group is a halogen, the halogen can be removed by means of a mild dehalogenation reaction. The reaction is typically performed as a post-reaction after the polymer has been formed, and in the presence of at least an ATRP catalyst. Preferably, the dehalogenation post-reaction is performed in the presence of both an ATRP catalyst and its associated ligand.

The mild dehalogenation reaction is performed by contacting the halogen terminated flow control agent of the present invention with one or more ethylenically unsaturated compounds, which are not readily radically polymerizable under at least a portion of the spectrum of conditions under which ATRP polymerizations are performed, hereinafter referred to as "limited radically polymerizable ethylenically unsaturated monomers" (LRPEU compound). As used herein, by "halogen terminated" and similar terms is meant to be inclusive also of pendant halogens, such as those that would be present in branched, comb and star polymers.

Not intending to be bound by any theory, it is believed, based on the evidence at hand, that the reaction between the halogen terminated polymeric flow control agent and one or more LRPEU compounds results in (1) removal of the terminal halogen group, and (2) the addition of at least one carbon-carbon double bond where the terminal carbon-halogen bond is broken.

The dehalogenation reaction is typically conducted at a temperature of from 0° C. to 200° C., preferably from 0° C. to 160° C. at a pressure in the range of 0.1 to 100 atmospheres, preferably from 0.1 to 50 atmospheres. The reaction is also typically performed in less than 24 hours, preferably between 1 and 8 hours. While the LRPEU compound may be added in less than a stoichiometric amount, it is preferably added in at least a stoichiometric amount relative to the number of moles of terminal halogen present in the polymeric flow control agent. When added in excess of a stoichiometric amount, the LRPEU compound is typically present in an amount of no greater than 5 mole percent, preferably 1 to 3 mole percent in excess of the total moles of terminal halogen.

Limited radically polymerizable ethylenically unsaturated compounds useful for dehalogenating the polymeric flow control agent of the composition of the present invention under mild conditions include those represented by the general formula XXXVII:

(XXXVII)

In general formula XXXVII, $R_{17}$ and $R_{18}$ can be the same or different organic groups such as alkyl groups having from 1 to 4 carbon atoms; aryl groups; alkoxy groups; ester groups; alkyl sulfur groups; acyloxy groups; and nitrogen-containing alkyl groups where at least one of the $R_{17}$ and $R_{18}$ groups is an organo group while the other can be an organo group or hydrogen. For instance, when one of $R_{17}$ and $R_{18}$ is an alkyl group, the other can be an alkyl, aryl, acyloxy, alkoxy, arenes, sulfur-containing alkyl group, or nitrogen-containing alkyl and/or nitrogen-containing aryl groups. The $R_{19}$ groups can be the same or different groups selected from hydrogen or lower alkyl selected such that the reaction between the terminal halogen or the polymeric flow control agent and the LRPEU compound is not prevented. Also an $R_{19}$ group can be joined to the $R_{17}$ and/or the $R_{18}$ groups to form a cyclic compound.

It is preferred that the LPREU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene(2,4,4-trimethyl-1-pentene).

For purposes of illustration, the reaction between halogen terminated polymeric flow control agent and LRPEU compound, such as alpha-methyl styrene, is summarized in the following general scheme 1.

General Scheme 1

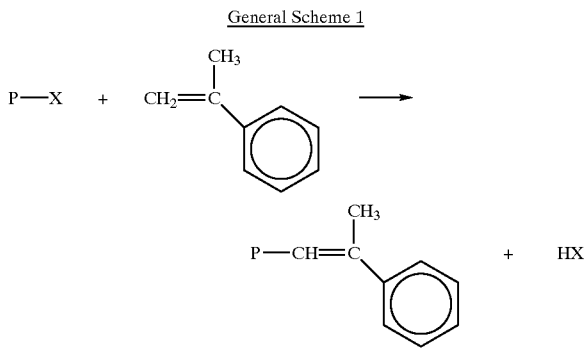

In general scheme 1, P—X represents the halogen terminated polymeric flow control agent.

The thermosetting coating composition of the present invention may be in the f or m of liquid coating compositions, example of which include aqueous and solvent-based coating compositions and electrodepositable coating compositions. The present thermosetting coating composition may also be in the form of a co-reactable solid particulate composition, such as a powder coating composition. Regardless of the form, the present thermosetting coating composition may be pigmented or clear, and may be used alone or in combination as primers, basecoats or topcoats.

Not wishing to be bound to a single theory, it is believed that the surface tension reducing effect of the low surface tension (meth)acrylate blocks of the block copolymer flow control additive of the present invention are responsible for the superior flow control properties and coating physical properties of the thermosetting coating composition of the present invention. It is believed that the low surface tension (meth)acrylate blocks orients at the coating/air interface, effectively reducing the surface tension of the coating, thus minimizing surface defects such as waviness and cratering. The non-low surface tension (meth)acrylate blocks extend into the coating adding strength to the coating and improving adhesion to the coated substrate. The orientation of the low surface tension (meth)acrylate blocks as described above is not possible with random copolymers. In a random copolymer, if the low surface tension (meth)acrylate monomer is present at high enough concentration, the entire polymer will orient at the coating/air interface. At lower low surface tension (meth)acrylate monomer concentration, the random copolymer will simply remain in the coating. Therefore, the dual properties of coating property improvement and improved adhesion to the substrate can not be realized with a random copolymer containing low surface tension (meth)acrylate monomer.

In an embodiment of the present invention, the coating composition is a co-reactable solid, particulate mixture of (a), (b), and (c). The present curable powder coating compositions will typically comprise (a) a first reactant having functional groups, for example an epoxide functional polymer reactant, (b) a second reactant that is a crosslinking agent having functional groups that are co-reactive towards and can form covalent bonds with the functional groups of the first reactant and (c) the (co)polymer low surface tension (meth)acrylate of the present invention as a copolymer flow control additive. The first and second reactants of the curable powder coating composition may each independently comprise one or more functional species, and are each present in amounts sufficient to provide cured coatings having a desirable combination of physical properties, such as smoothness, clarity, solvent resistance and hardness.

Not wishing to be limited to any one set of functional groups, there are several examples of co-reactive functional groups that can be used in the present invention. The functional groups of the first reactant can be, but are not limited to, epoxy, or oxirane; carboxylic acid; hydroxy; amide; oxazoline; aceto acetate; isocyanate; or carbamate. The second or crosslinking reactant has a functional group different than that contained in the first reactant and is co-reactive toward the functional groups of the first reactant and can be, but is not limited to epoxy or oxirane; carboxylic acid; hydroxy; polyol; isocyanate; capped isocyanate; amine; aminoplast and beta-hydroxyalkylamide.

One Example of curable powder coating compositions from which the compositions of the present invention may be an epoxide functional polymer as the first reactant and an epoxide reactive crosslinking agents, such as a carboxylic acid functional crosslinking agent, as the second reactant. Examples of this type of powder coating are disclosed in U.S. Pat. Nos. 5,407,707, 5,663,240 and 5,710,214. Another example is a powder coating composition comprising a carboxylic acid functional polymer as the first reactant and a beta-hydroxyalkylamide functional crosslinking agent as the second reactant, such as those disclosed in U.S. Pat. Nos. 4,889,890, 4,937,288, 5,098,955, 5,202,382 and 5,214,101. A further example is a powder coating composition comprising an hydroxy functional polymer as the first reactant and capped isocyanate functional crosslinking agent as the second reactant, such as those described in U.S. Pat. Nos. 4,997,900, 5,439,896, 5,508,337, 5,510,444, 5,554,692 and 5,777,061.

Polymers comprising the majority of the binder resins in curable powder coating compositions are solid at room temperature, typically having differential scanning calorimetry (DSC) derived glass transition midpoint values of from 30° C. to 80° C., preferably from 35° C. to 50° C. These polymers also typically have number average molecular weights (Mn) of from 500 to 15,000.

Classes of epoxide functional polymers from which the first reactant of the curable powder coating compositions of the present invention may be selected include, but are not limited to, epoxide functional vinyl polymers, of which epoxide functional (meth)acrylic polymers, epoxide functional polyethers, epoxide functional polyesters and combinations thereof are included. Epoxide functional vinyl polymers can be prepared by free radical polymerization methods that are known to those of ordinary skill in the art. Such known free radical polymerization methods typically make use of suitable initiators, which include organic peroxides and azo type compounds and chain transfer agents, such as alpha-methyl styrene dimer and tertiary dodecyl mercaptan.

Epoxide functional vinyl polymers are typically prepared by polymerizing one or more epoxide functional ethylenically unsaturated monomers, such as methyl(meth)acrylate, isobornyl(meth)acrylate, butyl(meth)acrylate and styrene. Examples of epoxide functional ethylenically unsaturated monomers that may be used in the preparation of epoxide functional vinyl polymers include, but are not limited to, glycidyl(meth)acrylate, 3,4-epoxycyclohexylmethyl(meth)acrylate, 2-(3,4-epoxycyclohexyl)ethyl(meth)acrylate and allylglycidyl ether. Examples of ethylenically unsaturated monomers that are free of epoxide functionality include those described in U.S. Pat. No. 5,407,707 at column 2, lines 17 through 56.

In a preferred embodiment of the present invention, the epoxide functional vinyl polymer is prepared from a majority of (meth)acrylate monomers and is referred to herein as an "epoxide functional (meth)acrylic polymer." The epoxide functional vinyl polymer typically has a number average molecular weight of from 500 to 5,000, preferably from 800 to 2,500.

Epoxide functional polyethers can be prepared from a hydroxyl functional monomer, such as a diol, and an epoxide functional monomer, and/or a monomer having both hydroxy and epoxide functionality. Suitable epoxide functional polyethers include, but are not limited to, those based on 4,4'-isopropylidenediphenol (Bisphenol A), a specific example of which is EPON® RESIN 2002 available commercially from Shell Chemicals.

Epoxide functional polyesters can be prepared by art-recognized methods, which typically include first preparing a hydroxyl functional polyester that is then reacted with epichlorohydrin. Polyesters having hydroxyl functionality may be prepared by art-recognized methods, which include reacting carboxylic acids (and/or esters thereof) having acid(or ester) functionalities of at least 2, and polyols having hydroxyl functionalities of at least 2. As is known to those of ordinary skill in the art, the molar equivalents ratio of carboxylic acid groups to hydroxyl groups of the reactants is selected such that the resulting polyester has hydroxy functionality and the desired molecular weight.

Examples of multifunctional carboxylic acids useful in preparing hydroxyl functional polyesters are known to the skilled artisan and include, for example, phthalic acid, tetrahydrophthalic acid, hexahydrophthalic acid, isophthalic acid and terephthalic acid. Examples of polyols useful in preparing hydroxy functional polyesters are known to those skilled in the art and include, for example, glycerin, trimethylolpropane, ethylene glycol and 1,4-dimethylolcyclohexane.

Epoxide reactive crosslinking agents that are used in thermosetting powder coating compositions comprising epoxide functional polymers may have functional groups selected from hydroxyl, thiol, primary amines, secondary amines, carboxyl and mixtures thereof. Useful epoxide reactive crosslinking agents having amine functionality include, for example, dicyandiamide and substituted dicyandiamides. Preferably, the epoxide reactive crosslinking agent has carboxylic acid groups. In one embodiment of the present invention, the epoxide reactive crosslinking agent has carboxylic acid functionality and is substantially crystalline. By "crystalline" is meant that the co-reactant contains at least some crystalline domains, and correspondingly may contain some amorphous domains. While not necessary, it is preferred that the epoxide reactive crosslinking agent have a melt viscosity less than that of the epoxy functional polymer (at the same temperature). As used herein, by "epoxide reactive crosslinking agent" is meant that the epoxide reactive crosslinking agent has at least two functional groups that are reactive with epoxide functionality.

Other suitable carboxylic acid functional crosslinking agents include those represented by the following general formula XXXVIII:

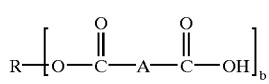

(XXXVIII)

wherein R is a residue from a polyol, A is a divalent linking group having from 1 to 10 carbon atoms, and b is an integer of from 2 to 10. Examples of polyols from which R of general formula XXXVIII may be derived include, but are not limited to ethylene glycol, di(ethylene glycol), trimethylolethane, trimethylolpropane, pentaerythritol, di-trimethylolpropane, di-pentaerythritol and mixtures thereof. Divalent linking groups from which A may be selected include, but are not limited to methylene; ethylene; propylene; isopropylene; butylene; pentylene; hexylene; heptylene; octylene; nonylene; decylene; cyclohexylene, such as 1,2-cyclohexylene; substituted cyclohexylene, such as 4-methyl-1,2-cyclohexylene; phenylene, such as 1,2-phenylene; and 4-carboxylic acid-1,2-phenylene. The divalent linking group A is preferably aliphatic.

The crosslinking agent represented by general formula XXXVIII is typically prepared from a polyol and a dibasic or cyclic anhydride. For example, trimethylol propane and hexahydro-4-methylphthalic anhydride are reacted together in a molar ratio of 1:3 respectively to form a carboxylic acid functional crosslinking agent. This particular crosslinking agent can be described with reference to general formula XXIV as follows, R is the residue of trimethylol propane, A is the divalent linking group 4-methyl-1,2-cyclohexylene, and b is 3. Carboxylic acid functional crosslinking agents described herein with reference to general formula XXXVIII are meant to include also any unreacted starting materials and/or co-products, for example oligomeric species, resulting from their preparation and contained therein.

Curable powder coating compositions comprising epoxide functional polymer and epoxide reactive crosslinking agent usually also include one or more cure catalysts for catalyzing the reaction between the reactive functional groups and the epoxide groups of the polymer. Examples of cure catalysts for use with acid functional crosslinking agents include tertiary amines, such as methyl dicocoamine, and tin compounds such as triphenyl tin hydroxide. The curing catalyst is typically present in the curable powder coating composition in an amount of less than 5 percent by weight, preferably from 0.25 to 2.0 percent by weight, based on the total resin solids weight of the composition.

Curable powder coating compositions that include epoxide functional polymers and epoxide reactive crosslinking agents typically have present therein epoxide functional polymers in an amount for from 60 to 95 percent by weight based on the total resin solids weight of the composition, preferably from 70 to 85 percent by weight, based on the total resin solids weight composition. The epoxide reactive crosslinking agent is typically present in the curable powder coating composition in an amount corresponding to the balance of these recited ranges, 5 to 40, preferably 15 to 30 percent by weight. The equivalent ratio of epoxide equivalents in the epoxide functional polymer to the equivalents of reactive functional groups is typically from 0.5:1 to 2:1, preferably from 0.8:1 to 1.5:1. Curable powder coating compositions comprising carboxylic acid functional crosslinking agent are typically cured at a temperature of from 121° C. to 177° C. over a period of from 10 to 60 minutes.

Curable powder coating compositions comprising carboxylic acid functional polymer as the first reactant (a) and beta-hydroxyalkylamide functional crosslinking agent as the second reactant (b) are also useful in the present invention. Classes of useful carboxylic acid functional polymers include, but are not limited to carboxylic acid functional vinyl polymers, carboxylic acid functional polyesters, carboxylic acid functional polyurethanes and mixtures thereof.

Carboxylic acid functional vinyl polymers can be prepared by free radical polymerization methods that are known to those of ordinary skill in the art, for example, free radical polymerization methods as described previously herein. The carboxylic acid functional vinyl polymer is typically prepared by polymerizing one or more carboxylic acid functional ethylenically unsaturated monomers, such as (meth) acrylic acid, with one or more ethylenically unsaturated monomers that are free of carboxylic acid functionality, such as, ethyl(meth)acrylate, isobornyl(meth)acrylate, butyl (meth)acrylate and styrene. Alternatively, the carboxylic acid functional vinyl polymer that is then reacted with a cyclic anhydride, such as succinic anhydride. Carboxylic vinyl polymers, such as (meth)acrylic polymers, useful in the present invention are described in further detail in U.S. Pat. No. 4,937,288, column 4, line 18 through column 6 line 12.

Carboxylic acid functional polyurethanes may be prepared by reacting polyols and polyisocyanates so as to form a polyurethane polyol, which is then reacted with polycarboxylic acid or cyclic anhydride to introduce free carboxylic acid into the reaction product. Carboxylic functional polyurethane that may be used in the curable powder coating compositions, which include beta-hydroxyalkylamide crosslinking agents are described in further detail in U.S. Pat. No. 4,937,288 at column 6, lines 13 through 39.

One or more beta-hydroxyalkylamide crosslinking agents may be present in the curable powder coating compositions comprising carboxylic acid functional polymer as the first reactant. The beta-hydroxyalkylamide crosslinking agent can be represented by the following general formula XXXIX:

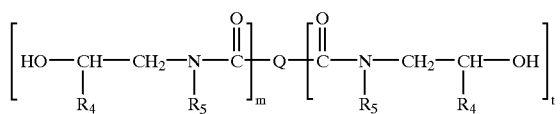

(XXXIX)

wherein $R_4$ is H or $C_1$ to $C_5$ alkyl; $R_5$ is H or $C_1$ to $C_5$ alkyl or a structure as defined by structure XL:

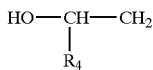

(XL)

for which $R_4$ is as described above, Q is a chemical bond or monovalent or polyvalent organic radical derived from saturated, unsaturated or aromatic hydrocarbon radicals including substituted hydrocarbon radicals containing from 2 to 20 carbon atoms, m equals 1 or 2, t equals 0 to 2, and m=t is at least 2. Preferably, Q is an alkylene radical —$(CH_2)_x$— where x is equal to 2 to 12, preferably 4 to 10; m is equal to 1 to 2, t is equal to 0 to 2, and m+t is at least 2, preferably greater than 2 up to and including 4. The beta-hydroxyalkylamide crosslinking agent represented by general formula XL can be prepared by art recognized methods, as described in, for example, U.S. Pat. No. 4,937,288 at column 7, lines 6 through 16.

Curable powder coating compositions comprising carboxylic acid functional polymer and beta-hydroxyalkylamide crosslinking agent typically have present therein carboxylic acid functional polymer in an amount of from 60 to 95 percent by weight, based on total resin solids weight of the composition, preferably from 80 to 90 percent by weight, based on total resin solids weight of the composition. The beta-hydroxyalkylamide crosslinking agent is typically present in the curable powder coating composition in an amount corresponding to the balance of the recited ranges, 5 to 40, preferably 10 to 20 percent by weight.

To achieve a suitable level of cure, the equivalent ratio of hydroxy equivalents in the beta-hydroxyalkylamide crosslinking agent to carboxylic acid equivalents in the carboxylic acid functional polymer is preferably from 0.6:1 to 1.6:1, preferably from 0.8:1 to 1.3:1. Ratios outside the range of 0.6:1 to 1.6:1 are generally undesirable due to the resulting poor cure response associated therewith. Curable powder coating compositions comprising carboxylic acid functional polymer and beta-hydroxyalkylamide functional crosslinking agent are typically cured at a temperature of from 149° C. to 204° C. over a period of from 10 to 60 minutes.

Also useful in the present invention are curable powder coating compositions comprising hydroxy functional polymer and capped isocyanate functional crosslinking agent. Hydroxy functional polymers that can be used in such compositions include, but are not limited to, hydroxy functional vinyl polymers, hydroxy functional polyesters, hydroxy functional polyurethanes and mixture thereof.

Vinyl polymers having hydroxy functionality can be prepared by free radical polymerization methods that are known to those of ordinary skill in the art, for example as described in U.S. Pat. No. 5,508,337, column 3, line 15 through column 5 line 23. In an embodiment of the present invention, the hydroxy functional vinyl polymer is prepared from a majority of (meth)acrylic monomers and is referred to herein as a "hydroxy functional (meth)acrylic polymer."

Hydroxy functional polyesters useful in curable powder coating compositions comprising capped isocyanate functional crosslinking agent can be prepared by art-recognized methods. Typically, diols and dicarboxylic acids or diesters of dicarboxylic acids are reacted in a proportion such that the molar equivalents of hydroxy groups is greater than that of carboxylic acid groups (or esters of carboxylic acid groups) with the concurrent removal of water or alcohols from the reaction medium. Hydroxy functional polyesters useful in the present invention are described in further detail in U.S. Pat. No. 5,508,337 at column 5, line 24 through column 6, line 30.

Hydroxy functional urethanes can be prepared by art-recognized methods, for example, as previously described herein. Hydroxy functional urethanes useful in the present invention are described in further detail in U.S. Pat. No. 5,510,444 at column 5, line 33 through column 7, line 61.

By "capped isocyanate crosslinking agent" is meant a crosslinking agent having two or more capped isocyanate groups that can decap (or deblock) under cure conditions, for example at elevated temperature, to form free isocyanate groups and free capping groups. The free isocyanate groups formed by decapping of the crosslinking agent are preferably capable of reacting and forming substantially permanent covalent bonds with the hydroxy groups of hydroxy functional polymer.

It is desirable that the capping group of the capped isocyanate crosslinking agent not adversely affect the curable powder coating composition upon decapping from the isocyanate, for example when it becomes a free capping group. For example, it is desirable that the free capping group neither become trapped in the cured film as gas bubbles nor excessively plasticize the cured film. Capping groups useful in the present invention preferably have the characteristics of being nonfugitive or capable of escaping substantially from the forming coating prior to its vitrification.

Classes of capping groups of the capped isocyanate crosslinking agent may be selected from: Hydroxy functional compounds, such as ethylene glycol butyl ether, phenol and p-hydroxy methylbenzoate; 1H-azoles, such as 1H-1,2,4-triazole and 1H-2,5-dimethyl pyrazole; lactams, such as e-caprolactam and 2-pyrolidone; ketoximes, such as 2-propane oxime and 2-butanone oxime and those described in U.S. Pat. No. 5,508,337 at column 7, lines 11 through 22, the disclosure of which is incorporated herein by reference. Other capping groups include morpholine, 3-aminopropyl morpholine and n-hydroxy phthalimide.

The isocyanate or mixture of isocyanates of the capped isocyanate crosslinking agent has two or more isocyanate groups and is preferably solid as room temperature. Examples of suitable isocyanates that may be used to prepare the capped isocyanate crosslinking agent include monomeric diisocyanates, such as $\alpha,\alpha'$-xylene diisocyanate, $\alpha,\alpha,\alpha',\alpha'$-tetramethylxylylene diisocyanate and 1-isocyanato-3-isocyanatomethyl-3,5,5-tri- methylcyclohexane (isophorone diisocyanate or IPDI), and dimers and trimers of monomeric diisocyanates containing isocyanurate, uretidino, biuret or allophanate linkages, such as the trimer of IPDI. Isocyanates that are useful in the present invention are described in further detail in U.S. Pat. No. 5,777,061 at column 3, line 4 through column 4, line 40, the disclosure of which is incorporated herein by reference. A particularly preferred isocyanate is a trimer of 1-isocyanato-3,3,5-trimethyl-5-isocyanato-methylcyclohexane.

The capped isocyanate crosslinking agent may also be selected from oligomeric capped isocyanate functional adducts. As used herein, by "oligomeric capped polyisocyanate functional adduct" is meant a material that is substantially free of polymeric chain extension. Oligomeric capped polyisocyanate functional adducts can be prepared by art-recognized methods from, for example, a compound containing three or more active hydrogen groups, such as trimethylolpropane (TMP); and an isocyanate monomer, such as 1-isocyanato-3,3,5-trimethyl-5-isocyanatomethylcyclohexane (IPDI) in a molar ratio of 1:3 respectively. In the case of TMP and IPDI, by employing art-recognized starved feed and/or dilute solution synthesis techniques, an oligomeric adduct having an average isocyanate functionality of 3 can be prepared ("TMP-3IPDI"). The three free isocyanate groups per TMP-3IPDI adduct are then capped with a capping group, such as 2-propane oxime or e-caprolactam.

To catalyze the reaction between the isocyanate groups of the capped polyisocyanate crosslinking agent and the hydroxy groups of the hydroxy functional polymer, one or more catalysts are typically present in the powder coating composition in amounts of from, for example, 0.1 to 5 percent by weight, based on total resin solids of the composition. Classes of useful catalysts include, metal compounds, in particular, organic tin compounds, such as tin(II)octanoate and dibutyltin(IV)dilaurate, and tertiary amines, such as diazabicyclo[2.2.2]octane. Examples of organic tin compounds and tertiary amines are described in U.S. Pat. No. 5,508,337 at column 7, lines 28 through 49, the disclosure of which is incorporated herein by reference.

Curable powder coating compositions of the present invention include those where the first reactant is selected from acid functional polyesters and the second reactant is a glycidyl isocyanurates and/or a bisphenol A epoxide.

Curable powder coating compositions comprising hydroxy functional polymer and capped isocyanate functional crosslinking agent, typically have present therein hydroxy functional polymer in an amount of from 55 to 95 percent by weight, based on total resin solids weight of the composition, preferably from 75 to 90 percent by weight based on total resin solids weight of the composition. The capped isocyanate functional crosslinking agent is typically present in the powder composition in an amount corresponding to the balance of these recited ranges, 5 to 45, preferably 10 to 25 percent by weight.

The equivalent ratio of isocyanate equivalents in the capped isocyanate crosslinking agent to hydroxy equivalents in the capped isocyanate crosslinking agent to hydroxy equivalents in the hydroxy functional polymer is typically within the range of 1:3 to 3:1, preferably 1:2 to 2:1. While equivalent ratios outside of this range can be employed, that they are generally less desirable due to performance deficiencies in cured films obtained therefrom. Powder coating compositions comprising hydroxy functional polymer and capped isocyanate functional crosslinking agent are typically cured at a temperature of from 120° C. to 190° C. over a period of from 10 to 60 minutes.

Curable powder coating compositions may optionally contain additives such as waxes to improve the slip properties of the cured coating, degassing additives such as benzoin, adjuvant resin to modify and optimize coating properties, antioxidants and ultraviolet (UV) light absorbers. Examples of useful antioxidants and UV light absorbers include those available commercially from Ciba Specialty Chemicals under the trade names IRGANOX and TINUVIN. These optional additives, when used, are typically present in amounts up to percent by weight, based on total weight of resin solids of the curable composition.

Curable powder coating compositions useful in the present invention are typically prepared by first dry blending the functional polymer, for example epoxide functional polymer; the crosslinking agent; the polymeric flow control agent and additives such as degassing agent and catalysts in a blender, such as a Henshel blade blender. The blender is operated for a period of time sufficient to result in a homogeneous dry blend of the materials charged thereto. The homogeneous dry blend is then melt blended in an extruder, such as a twin screw co-rotating extruder, operated within a temperature range sufficient to melt but not gel the components. For example, when preparing curable powder coating compositions comprising epoxide functional crosslinking agent, the extruder is typically operated within a temperature range of from 80° C. to 140° C., preferably from 100° C. to 125° C.

Optionally, curable powder coating compositions of the present invention may be melt blended in two or more steps. For example, a first melt blend is prepared in the absence of cure catalyst. A second melt blend is prepared at a lower temperature, from a dry blend of the first melt blend and the cure catalyst. The melt blend curable powder coating composition is typically milled to an average particle size of from, for example, 15 to 30 microns.

The present invention is more particularly described in the following examples, which are intended to be illustrative only, since numerous modifications and variations therein will be apparent to those skilled in the art. Unless otherwise specified, all parts and percentages are by weight.

EXAMPLES 1–5

A 2 liter 4 neck round bottom flask was equipped with a stirrer, temperature probe, addition funnels and a nitrogen source. To the flask 300.0 grams of toluene, 5.5 grams of copper powder, 13.6 grams of dipyridyl and ethyl-2- bromoisobutyrate (amount in table 1) were added. A light nitrogen sparge was introduced and the material was heated to 50° C. at which time the sparge was removed and a nitrogen blanket was maintained for the duration of the process. The contents of the flask were heated to 90° C. over 30 minutes.

The monomers for block 1 were fed as a mixture of 287.5 grams of isobutyl methacrylate and 14.5 grams 2-hydroxypropyl methacrylate to the flask over 30-minutes from an addition funnel with the temperature being maintained at 90±2° C. Following the addition, 5.0 grams of toluene were used to rinse and clean the addition funnel and was added to the flask directly. The conversion of the polymerization was followed by total solids determination (30 minutes @ 120° F.) every 30 minutes. When a conversion of greater than 95% was observed, the monomer mix for the second block, consisting of 287.5 grams of 2-ethylhexyl methacrylate and 10.5 grams of 2-hydroxy ethyl methacrylate were added over a 30-minutes followed by a 5.0 gram toluene rinse. Conversion was followed as explained above until greater than 95% conversion was attained. The monomer for a third block, 2-(perfluoroalkyl) ethyl methacrylate (obtained from DuPont as Zonyl® TM), was mixed with 30 grams of toluene and was added to the flask over a 15-minute period followed by a 5.0 gram toluene rinse. Conversion was followed as outlined above. After the target conversion was achieved, the mass was cooled to ambient temperature and 62.5 grams of magnesium silicate was added along with 500 grams of toluene. The material was stirred and heated to 90° C. and held at that temperature for 1 hour. The material was then cooled to ambient temperature and filtered through a premade filter cake in a filter press (25.0 grams magnesium silicate and 350 grams of toluene) in which the magnesium silicate in the press had been allowed to settle. The filtered material was vacuum stripped and the temperature was taken to 158° C. at a maximum vacuum of 720 mm of mercury. Table 1 details the amount of each monomer used in each example as well as the molecular weight data for each polymer, determined by gel permeation chromatography using polystyrene standards.

EXAMPLE 6

Comparative example made using conventional free radical polymerization techniques. To a 2 liter four neck round bottom flask equipped as outlined above, 236.9 of xylene was added. The xylene was lightly sparged with nitrogen and heated to 80° C. at which point the sparge was removed and a nitrogen blanket was initiated and used throughout the entire polymerization. The charge was then heated to 140° C.+/−2° C. during the polymerization. An initiator charge comprised of 60.0 grams of di-t-amyl peroxide in 80.0 grams of xylene was started and added over a 2-hour period. Ten minutes after the initiator charge was started a monomer charge comprised of 586.0 grams of 2-ethylhexyl acrylate, 168.0 grams of ethyl acrylate and 64.0 grams of 2-(N-ethylperfluorooctanesulfonamido)ethyl methacrylate obtained from 3M as Fluorad FX-14 was started and added over ninety minutes. After both charges were added the reaction was held for 2 hours at temperature. A post reaction initiator charge was comprised of 4.0 grams of t-butylperacetate (Lupersol 75M) was added over 15 minutes and the reaction was held for 2 hours. The flask was then heated to 155° C. and distillate was removed. When no more distillate was obtained a vacuum strip was done to remove the last vestiges of solvent and unrecalled monomers. The peak MW was 8357 the number average was 4432 and the polydispersity was 2.7 as determined by gel permeation chromatography using polystyrene standards.

EXAMPLES 7–12

Epoxy-acid powder clear coat compositions, Examples 7–12 were processed as follows: The components were blended in a Henschel Blender for 60 to 90 seconds. The mixtures were then extruded through a Werner & Pfleider co-rotating twin screw extruder at a 450 RPM screw speed and an extrudate temperature of 100° C. to 125° C. The extruded material was then ground to a particle size of 17 to 27 microns using an ACM Grinder (Air Classifying Mill from Micron Powder Systems, Summit, N.J.). The finished powders were electrostatically sprayed onto test panels and evaluated for coatings properties.

Flow Additive Resin Example #6 is a comparative example, which was made by a conventional free radical acrylic polymerization, not an ATRP controlled polymerization. In Table 2, all amounts shown are parts by weight.

TABLE 1

| Ex. No. | Block 1 | | | Block 2 | | Block 3 | Molecular Wt. Data | | |
|---|---|---|---|---|---|---|---|---|---|
| | EBIB (g) | IBMA (g) | HPMA (g) | EHMA (g) | HEMA (g) | PFEM (g) | Peak MW | Mn | PDI |
| 1 | 17.0 | 287.5 | 14.5 | 287.5 | 10.5 | 3.88 | 16,119 | 8,123 | 1.8 |
| 2 | 17.0 | 287.5 | 14.5 | 287.5 | 10.5 | 7.7 | 15,734 | 7,927 | 1.7 |
| 3 | 17.0 | 287.5 | 14.5 | 287.5 | 10.5 | 11.6 | 15,763 | 5,903 | 1.5 |
| 4 | 17.0 | 287.5 | 14.5 | 287.5 | 10.5 | 15.5 | 16,713 | 8,485 | 1.7 |
| 5 | 18.2 | 287.5 | 14.5 | 287.5 | 10.5 | 17.9 | 17,003 | 9,212 | 1.7 |

EBIB - ethyl-2-bromoisobutyrate
IBMA - isobutyl methacrylate, Tg = 55° C.
HPMA - 2-hydroxypropyl methacrylate, Tg = 76° C.
EHMA - 2-ethylhexyl methacrylate, Tg = −10° C.
HEMA - 2-hydroxyethyl methacrylate, Tg = 70° C.
PFEM - 2-(perfluoroalkyl)ethyl methacrylate (Zonyl ® TM, DuPont)
EPOSAEM - 2-(N-ethylperfluorooctanesulfonamido) ethyl methacrylate (Fluorad FX-14 from 3M)
PDI = Mw/Mn

TABLE 2

| Ingredient | Ex. 7 | Ex. 8 | Ex. 9 | Ex. 10 | Ex. 11 | Example 12 Comparative |
|---|---|---|---|---|---|---|
| Resin[1] | 1037.0 | 1037.0 | 1037.0 | 1037.0 | 829.6 | 829.6 |
| DDDA[2] | 340.5 | 340.5 | 340.5 | 340.5 | 272.4 | 272.4 |
| Ex. 1* | 15.0 | | | | | |
| Ex. 2* | | 15.0 | | | | |
| Ex. 3* | | | 15.0 | | | |
| Ex. 4* | | | | 15.0 | | |
| Ex. 5* | | | | | 12.0 | |
| Ex. 6* | | | | | | 12.0 |
| Benzoin | 3.0 | 3.0 | 3.0 | 3.0 | 2.4 | 2.4 |
| Wax C Micropowder[3] | 9.0 | 9.0 | 9.0 | 9.0 | 7.2 | 7.2 |
| TINUVIN 144[4] | 30.0 | 30.0 | 30.0 | 30.0 | 24.0 | 24.0 |
| CGL-1545[5] | 30.0 | 30.0 | 30.0 | 30.0 | 24.0 | 24.0 |
| GCA-1[6] | 30.0 | 30.0 | 30.0 | 30.0 | 24.0 | 24.0 |
| ARMEEN M2C[7] | 5.6 | 5.6 | 5.6 | 5.6 | 4.4 | 4.4 |

[1]GMA Functional Acrylic Resin
[2]Dodecanedioic Acid.
[3]Wax C Micro Powder, a fatty acid amide (ethylene bis-stearoylamide), commercially available from Hoechst-Celanese.
[4]TINUVIN 144 (2-tert-butyl-2-(4-hydroxy-3,5-di-tert-butylbenzyl)[bis(methyl-2,2,6,6,-tetramethyl-4-piperidinyl)]dipropionate), an ultraviolet light stabilizer available from Ciba-Geigy Corp.
[5]CGL-1545 (2-[4((2-Hydroxy-3-(2-ethylhexyloxy) propyl)-oxy]-2-hydroxyphenyl)-4,6-bis(2,4-dimethylphenyl-1,3,5-triazine), an ultraviolet light stabilizer available from Ciba-Geigy Corp.
[6]GCA-1, an anti-yellowing agent commercially available from Sanko Chemical Corp.
[7]Methyl dicocoaine available from Akzo-Nobel Corp.
*Resin from the specified example The powder coating compositions of Examples A to F were prepared for testing in the following manner. Test panels, coated with a black electrocoat primer commercially available from PPG Industries, Inc. as ED-5051, were coated with each of the powder clearcoats by electrostatic spray. The coated test panels were then cured for 30 minutes at 293° F. (145° C.). The dry film thickness (DFT) of the powder clear coat was 61–69 microns. Examples 7–11 all resulted in test panels that exhibited glossy clear films with good appearance. The crater robustness of the test panel for Example 7 was acceptable, while Examples 8–11 all had good crater robustness on the test panels that were sprayed. The test panel for example 12 had poor appearance and its crater robustness was also poor.

The data demonstrate the ability of the block copolymer flow control agent of the present invention to effectively improve the finished appearance of powder coatings.

The present invention has been described with reference to specific details of particular embodiments thereof. It is not intended that such details be regarded as limitations upon the scope of the invention except insofar as and to the extent that they are included in the accompanying claims.

We claim:

1. A thermosetting coating composition comprising:
   (a) a first reactant having functional groups;
   (b) a second reactant having functional groups that are coreactive with the functional groups of said first reactant; and
   (c) a block copolymer flow control additive comprising:
      (i) a first block comprising residues of a first radically polymerizable (meth)acrylate monomer selected from at least one monomer represented by the general formulas:

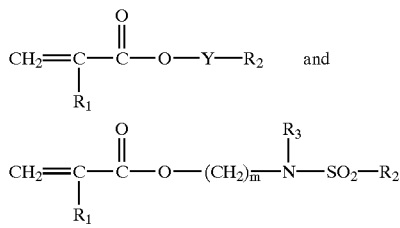

wherein $R_1$ is selected independently for each general formula from hydrogen, methyl and ethyl; $R_2$ is selected independently for each general formula from the group consisting of linear, branched, cyclic, aryl and arylalkyl fluorinated hydrocarbon groups containing from 4–20 carbon atoms, a siloxane, a polysiloxane, an alkyl siloxane, an ethoxylated trimethylsilyl siloxane and a propoxylated trimethylsilyl siloxane; Y is a divalent linking group containing from 1 to 20 carbon atoms; m is an integer from 1 to 4; and $R_3$ is a $C_1$–$C_4$ alkyl group; and
      (ii) a second block comprising residues of a second radically polymerizable ethylenically unsaturated monomer that is free of hydroxyl groups and amine groups; wherein said first block and said second block are different from each other, and said block copolymer is prepared by controlled radical polymerization and has a polydispersity index of less than 2.5.

2. The coating composition of claim 1 wherein said block copolymer flow control agent further comprises (iii) a third block comprised of residues of a third radically polymerizable ethylenically unsaturated monomer that is free of hydroxyl groups and amine groups, the monomers of said third block being different than the monomers of said first block and said second block.

3. The coating composition of claim 1 wherein the structure of group $R_2$ is selected from the group consisting of:

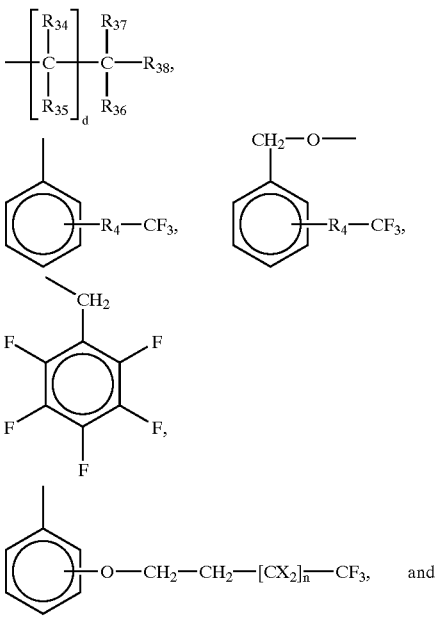

-continued

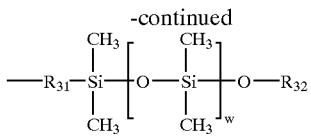

wherein $R_{34}$, $R_{35}$, $R_{36}$, $R_{37}$ and $R_{38}$ are independently selected from the group consisting of H, F and $C_1$ to $C_6$ alkyl; such that at least one occurrence of $R_{34}$, $R_{35}$, $R_{36}$, $R_{37}$ or $R_{38}$ is F; d is an integer from 3 to 19; $R_4$ is selected from the group consisting of $C_1$–$C_4$ alkyl and $C_1$–$C_4$ alkynol; X is selected from the group consisting of H and F; n is an integer from 1 to 10; $R_{31}$ is selected from the group consisting of linear, branched and cyclic $C_2$–$C_{18}$ alkyl and a polyether as described by:

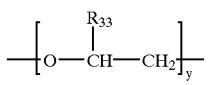

wherein $R_{33}$ is selected from the group consisting of hydrogen, halide and methyl; y is an integer from 1 to 100; $R_{32}$ is selected from the group consisting of H, linear, branched and cyclic $C_2$–$C_{18}$ alkyl and a trimethylsiloxane as described by:

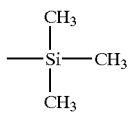

and w is an integer from 0 to 500.

4. The coating composition of claim 2 wherein the calculated Tg value of said third block is at least 20° C. less than the calculated Tg value of said second block.

5. The coating composition of claim 2 wherein at least one of said second block and said third block of said flow additive comprises a minor amount of a hydroxy functional radically polymerizable ethylenically unsaturated monomer.

6. The coating composition of claim 1 wherein said controlled radical polymerization method is atom transfer radical polymerization.

7. The coating composition of claim 6 wherein said block copolymeric flow additive is prepared by atom transfer radical polymerization initiated in the presence of an initiator having at least one radically transferable group.

8. The coating composition of claim 7 wherein said block copolymeric flow additive contains a residue of said initiator free of said radically transferable group, and a residue of or derived from said radically transferable group, said initiator being selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable halide.

9. The coating composition of claim 8 wherein said initiator is selected from the group consisting of halomethane, methylenedihalide, haloform, carbon tetrahalide, 1-halo-2,3-epoxypropane, methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, mono-hexakis(α-halo-$C_1$–$C_6$-alkyl)benzene, diethyl-2-halo-2-methyl malonate and mixtures thereof.

10. The coating composition of claim 1 wherein said block copolymeric flow additive is selected from the group consisting of linear copolymers, branched copolymers, hyperbranched copolymers, star copolymers, graft copolymers and mixtures thereof.

11. The coating composition of claim 1 wherein said first block of said block copolymeric flow additive is present in an amount of from 0.01 percent by weight to 5.0 percent by weight, based on the total weight of said block copolymeric flow additive; and said second block of said block copolymeric flow additive is present in an amount of from 95 percent by weight to 99.99 percent by weight, based on the total weight of said block copolymeric flow additive.

12. The coating composition of claim 2 wherein said first block is present in an amount of from 0.01 percent by weight to 5 percent by weight, based on the total weight of said block copolymer; said second block is present in an amount of from 25 percent by weight to 75 percent by weight, based on the total weight of said block copolymer; and said third block is present in an amount of from 20 percent by weight to 74.99 percent by weight, based on the total weight of said block copolymer.

13. The coating composition of claim 5 wherein said hydroxy functional monomer is present in at least one of said second block and said third block of said block copolymeric flow additive in an amount of from 0.01 percent by weight to 3.0 percent by weight, based on the total weight of said block copolymeric flow additive.

14. The coating composition of claim 2 wherein each of said second monomer and said third monomer of said block copolymeric flow additive are independently selected from vinyl monomers, allylic monomers, olefins and mixtures thereof.

15. The coating composition of claim 1 wherein said block copolymeric flow additive is a di-block copolymeric flow additive comprising said first block and said second block, and the monomers in said second block being one or more selected from the group consisting of isobornyl(meth)acrylate, n-butyl methacrylate, iso-butyl methacrylate, ethyl methacrylate, iso-decyl(meth)acrylate, lauryl(meth)acrylate, n-octyl(meth)acrylate, 2-ethylhexyl(meth)acrylate, n-butyl acrylate, iso-butyl acrylate, ethyl acrylate and mixtures thereof.

16. The coating composition of claim 1 wherein said block copolymeric flow additive is a di-block copolymeric flow additive comprising said first block and said second block, wherein said first block comprises said first radically polymerizable (meth)acrylate monomer and one or more other radically polymerizable ethylenically unsaturated monomers.

17. The coating composition of claim 16 wherein said other radically polymerizable ethylenically unsaturated monomers are one or more selected from the group consisting of isobornyl(meth)acrylate, n-butyl methacrylate, iso-butyl methacrylate, ethyl methacrylate, iso-decyl(meth)acrylate, lauryl(meth)acrylate, n-octyl(meth)acrylate, 2-ethylhexyl(meth)acrylate, n-butyl acrylate, iso-butyl acrylate, ethyl acrylate and mixtures thereof.

18. The coating composition of claim 3 wherein the first radically polymerizable (meth)acrylate monomer is selected from the group consisting of perfluoroalkyl ethyl(meth)acrylates wherein the perfluoroalkyl group contains 4–20 carbon atoms; benzyl ether(meth)acrylates of a $C_9$–$C_{10}$ partially fluorinated alcohol; (meth)acrylate esters of a $C_9$–$C_{10}$ partially fluorinated alcohol; (meth)acryloxyalkyl terminated polydimethylsiloxanes, (meth)acryloxyalkyl tris (trimethylsiloxy silanes), and (meth)acryloxyalkyl trimethylsiloxy terminated polyethylene oxide.

19. The coating composition of claim 16 wherein said first block of said block copolymeric flow additive is present in an amount of from 25 percent by weight to 75 percent by weight, based on the total weight of said block copolymeric flow additive; and said second block of said block copolymeric flow additive is present in an amount of from 25 percent by weight to 75 percent by weight, based on the total weight of said block copolymeric flow additive.

20. The coating composition of claim 14 wherein said block copolymeric flow additive is a tri-block copolymeric flow additive comprising said first block, said second block and said third blocks, and at least one of the monomers in said second block and said third block is selected from the group consisting of isobornyl(meth)acrylate, n-butyl methacrylate, iso-butyl methacrylate, ethyl methacrylate, iso-decyl(meth)acrylate, lauryl(meth)acrylate, n-octyl (meth)acrylate, 2-ethylhexyl(meth)acrylate, n-butyl acrylate, iso-butyl acrylate, ethyl acrylate and mixtures thereof.

21. The coating composition of claim 5 wherein said hydroxy functional monomer of said block copolymeric flow additive is selected from the group consisting of: hydroxyalkyl(meth)acrylates having from 2 to 20 carbon atoms in the alkyl group; epoxide functional ethylenically unsaturated radically polymerizable monomers, which are hydrolyzed; hydroxyalkyl(meth)acrylates having from 2 to 20 carbon atoms in the alkyl group, which are reacted with a lactone; beta-hydroxy ester functional (meth)acrylates, which are the reaction product of (i) (meth)acrylic acid and a glycidyl ester of a monocarboxylic acid having from 4 to 26 carbon atoms, or (ii) glycidyl(meth)acrylate and a saturated monocarboxylic acid having from 4 to 26 carbon atoms; and mixtures thereof.

22. The coating composition of claim 21 wherein said hydroxyalkyl(meth)acrylate is selected from hydroxyethyl (meth)acrylate, hydroxypropyl(meth)acrylate, hydroxybutyl (meth)acrylate and mixtures thereof; said epoxide functional monomer is selected from the group consisting of glycidyl (meth)acrylate, 3,4-epoxycyclohexylmethyl(meth)acrylate, 2-(3,4-epoxycyclohexyl)ethyl(meth)acrylate, allyl glycidyl ether and combinations thereof; said lactone is selected from the group consisting of β-propiolactone, β-butyrolactone, γ-butyrolactone, α-methyl-γ-butyrolactone, δ-valerolactone, γ-lactone, γ-caprolactone, ε-caprolactone and mixtures thereof; and said beta-hydroxy ester functional (meth) acrylate is the reaction product of glycidyl(meth)acrylate and isostearic acid.

23. The coating composition of claim 1 wherein said block copolymeric flow additive has a number average molecular weight of from 500 to 100,000.

24. The coating composition of claim 1 wherein $R_1$ is hydrogen or methyl, Y is —$(CH_2)_n$—, and n is an integer from 1 to 11.

25. The coating composition of claim 1 wherein said block copolymeric flow additive is present in an amount of from 0.01 percent by weight to 5 percent by weight, based on the total resin solids weight of said coating composition.

26. The coating composition of claim 1, wherein the functional groups of the first reactant (a) are selected from the group consisting of: epoxy, oxirane, carboxylic acid, hydroxy, amide, oxazoline, aceto acetate, isocyanate, and carbamate; and the functional groups of the second reactant (b) are different than those in the first reactant (a), are reactable with those in the first reactant (a), and are selected from the group consisting of epoxy, oxirane, carboxylic acid, hydroxy, polyol, isocyanate, capped isocyanate, amine, aminoplast and beta-hydroxyalkylamide.

27. The coating composition of claim 1 wherein said coating composition is a co-reactable solid, particulate mixture of (a), (b) and (c).

28. The coating composition of claim 26 wherein said first reactant is selected from epoxide functional polymers, carboxylic acid functional polymers and hydroxy functional polymers, and said second reactant is a crosslinking agent having functional groups that are co-reactive with the functional groups of said first reactant.

29. The coating composition of claim 26 wherein said first reactant is selected from carboxylic acid functional polymers, and said second reactant is a beta-hydroxyalkylamide functional crosslinking agent.

30. The coating composition of claim 26 wherein said first reactant is selected from hydroxy functional polymers, and said second reactant is a capped isocyanate functional crosslinking agent.

31. The coating composition of claim 26 wherein said first reactant is selected from acid functional polyesters and said second reactant is selected from glycidyl isocyanurates and bisphenol A epoxides.

32. The coating composition of claim 26 wherein said first reactant is selected from epoxide functional polymers and said second reactant is a carboxylic acid functional crosslinking agent.

33. The coating composition of claim 32 wherein said first reactant is an epoxide functional (meth)acrylic polymer, and said carboxylic acid functional crosslinking agent is selected from the group consisting of dodecanedioic acid, azelaic acid, adipic acid, 1,6-hexanedioic acid, succinic acid, pimelic acid, sebacic acid, maleic acid, citric acid, itaconic acid, aconitic acid, carboxylic acid functional crosslinking agents represented by the following general formula:

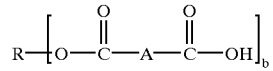

wherein R is the residue of a polyol, A is a divalent linking group having from 2 to 10 carbon atoms, and b is an integer of from 2 to 10, and mixtures of such carboxylic acid functional crosslinking agents.

34. The coating composition of claim 33 wherein said polyol from which R is derived is selected from the group consisting of ethylene glycol, di(ethylene glycol), trimethylolethane, trimethylolpropane, pentaerythritol, di-trimethylolpropane and di-pentaerythritol; A is selected from the group consisting of 1,2-cyclohexylene and 4-methyl-1,2-cyclohexylene; and b is an integer of from 2 to 6.

35. The coating composition of claim 1 wherein the block copolymeric flow control agent has at least one of the following polymer chain structures:

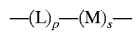

and

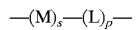

wherein L represents the first block of residues (i); M represents the second block of residues of at least one second ethylenically unsaturated radically polymerizable monomer that is free of hydroxyl groups and amine groups (ii); s and p represent average numbers of residues occurring in a block of residues; and s and p are each independently from 1 to 100 for each structure.

36. The coating composition of claim 35 wherein said block copolymeric flow additive is a di-block copolymeric flow additive comprising said first block (—L—) and said second block (—M—), and the monomers in said second block being one or more selected from the group consisting of isobornyl(meth)acrylate, n-butyl methacrylate, iso-butyl methacrylate, ethyl methacrylate, iso-decyl(meth)acrylate, lauryl(meth)acrylate, n-octyl(meth)acrylate, 2-ethylhexyl (meth)acrylate, n-butyl acrylate, iso-butyl acrylate, ethyl acrylate and mixtures thereof.

37. The coating composition of claim 35 wherein said block copolymeric flow additive is a di-block copolymeric flow additive comprising said first block (—L—) and said second block (—M—), wherein said first block further comprises one or more other radically polymerizable ethylenically unsaturated monomers.

38. The coating composition of claim 37 wherein said other radically polymerizable ethylenically unsaturated monomers are one or more selected from the group consisting of isobornyl(meth)acrylate, n-butyl methacrylate, iso-butyl methacrylate, ethyl methacrylate, iso-decyl(meth) acrylate, lauryl(meth)acrylate, n-octyl(meth)acrylate, 2-ethylhexyl(meth)acrylate, n-butyl acrylate, iso-butyl acrylate, ethyl acrylate and mixtures thereof.

39. The coating composition of claim 35 wherein said first block (—L—) of said block copolymeric flow additive is present in an amount of from 25 percent by weight to 75 percent by weight, based on the total weight of said block copolymeric flow additive; and said second block (—M—) of said block copolymeric flow additive is present in an amount of from 25 percent by weight to 75 percent by weight, based on the total weight of said block copolymeric flow additive.

40. The coating composition of claim 2 wherein said block copolymer contains at least one of the following polymer chain structures:

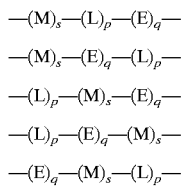

and

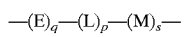

in which L represents the first block of residues (i); M represents the second block of residues of at least one second ethylenically unsaturated radically polymerizable monomer (ii); E represents the third block of residues of at least one third radically polymerizable ethylenically unsaturated monomer; the monomer compositions of said first block, said second block and said third block all being different; s, p and q represent average numbers of residues occurring in a block of residues; and s, p and q are each independently from 1 to 100 for each structure.

41. The coating composition of claim 40 wherein said first block (L) is present in an amount of from 0.01 percent by weight to 5 percent by weight, based on the total weight of said block copolymer; said second block (M) is present in an amount of from 25 percent by weight to 75 percent by weight, based on the total weight of said block copolymer; and said third block (E) is present in an amount of from 20 percent by weight to 74.99 percent by weight, based on the total weight of said block copolymer.

42. The coating composition of claim 40 wherein the calculated Tg value of said third block (E) is at least 20° C. less than the calculated Tg value of said second block (M).

43. The coating composition of claim 40 wherein the polymer chain structure is —(M)$_s$—(E)$_q$—(F)$_p$—.

44. The coating composition of claim 40 wherein said block copolymer is prepared by atom transfer radical polymerization in the presence of an initiator having a radically transferable group, said block copolymer having at least one of the following representative polymer chain structures:

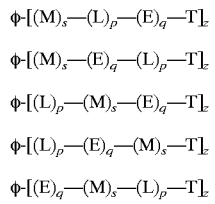

and

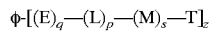

in which φ is or is derived from the residue of said initiator free of said radically transferable group; T is or is derived from said radically transferable group of said initiator; z is independently for each structure at least 1.

45. The coating composition of claim 44 wherein T is halide.

46. The coating composition of claim 44 wherein T is derived from a dehalogenation post-reaction.

47. The coating composition of claim 46 wherein said dehalogenation post-reaction comprises contacting said polymeric flow control agent with a limited radically polymerizable ethylenically unsaturated compound.

48. The coating composition of claim 47 wherein the limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

49. The coating composition of claim 47 wherein said block copolymer has the following representative polymer chain structure:

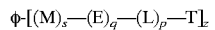

in which the first block (L) comprises at least one (meth) acrylate monomer residue selected from the group consisting of perfluoroalkyl ethyl(meth)acrylates wherein the perfluoroalkyl group contains 4–20 carbon atoms; benzyl ether (meth)acrylates of a $C_9$–$C_{10}$ partially fluorinated alcohol; (meth)acrylate esters of a $C_9$–$C_{10}$ partially fluorinated alcohol; (meth)acryloxyalkyl terminated polydimethylsiloxanes, (meth)acryloxyalkyl tris(trimethylsiloxy silanes), and (meth)acryloxyalkyl trimethylsiloxy terminated polyethylene oxide; the second block (M) comprises one or more monomer residues selected from isobornyl(meth)acrylate, n-butyl methacrylate, iso-butyl methacrylate, ethyl methacrylate and mixtures thereof; the third block (E) comprises one or more monomer residues selected from the group consisting of iso-decyl(meth)acrylate, lauryl(meth)acrylate, n-octyl(meth)acrylate, 2-ethylhexyl(meth)acrylate, n-butyl acrylate, iso-butyl acrylate, ethyl acrylate; and z is an integer of at least 1.

50. The coating composition of claim 49 wherein z is 1.

51. A method of coating a substrate comprising:
(A) applying to said substrate a thermosetting composition;
(B) coalescing said thermosetting composition to form a substantially continuous film; and (C) curing said thermosetting composition by the application of heat, wherein said thermosetting composition comprises a co-reactable solid, particulate mixture of:
(i) a first reactant having functional groups;
(ii) a second reactant having functional groups that are coreactive with the functional groups of said first reactant; and
(iii) a block copolymer flow control additive comprising:
(a) a first block comprising residues of a first radically polymerizable (meth)acrylate monomer selected from at least one monomer represented by the general formulas,

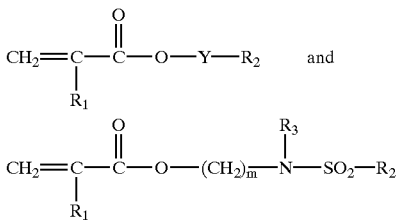

wherein $R_1$ is selected independently for each general formula from hydrogen, methyl and ethyl; $R_2$ is selected independently for each general formula from the group consisting of linear, branched, cyclic, aryl and arylalkyl fluorinated hydrocarbon groups containing from 4–20 carbon atoms, a siloxane, a polysiloxane, an alkyl siloxane, an ethoxylated trimethylsilyl siloxane and a propoxylated trimethylsilyl siloxane; Y is a divalent linking group containing from 1 to 20 carbon atoms; m is an integer from 1 to 4; and $R_3$ is a $C_1$–$C_4$ alkyl group; and
(b) a second block comprising residues of a second radically polymerizable ethylenically unsaturated monomer that is free of hydroxyl groups and amine groups; wherein said first and second blocks are different from each other, and said block copolymer is prepared by controlled radical polymerization and has a polydispersity index of less than 2.5.

52. The method of claim 51, wherein the functional groups of the first reactant having functional groups (i) are selected from the group consisting of epoxy, oxirane, carboxylic acid, hydroxy, amide, oxazoline, aceto acetate, isocyanate, and carbamate; and the functional groups of the second reactant having functional groups (ii) are different than those in the first reactant having functional groups (i), are reactable with those in the first reactant having functional groups (i), and are selected from the group consisting of epoxy, oxirane, carboxylic acid, hydroxy, polyol, isocyanate, capped isocyanate, amine, aminoplast and beta-hydroxyalkylamide.

53. The method of claim 51 wherein said block copolymer flow control agent further comprises (c) a third block comprised of residues of a third radically polymerizable ethylenically unsaturated monomer that is free of hydroxyl groups and amine groups, said third monomer being different than said first monomer and said second monomer.

54. The method of claim 51 wherein the structure of group $R_2$ is selected from the group consisting of:

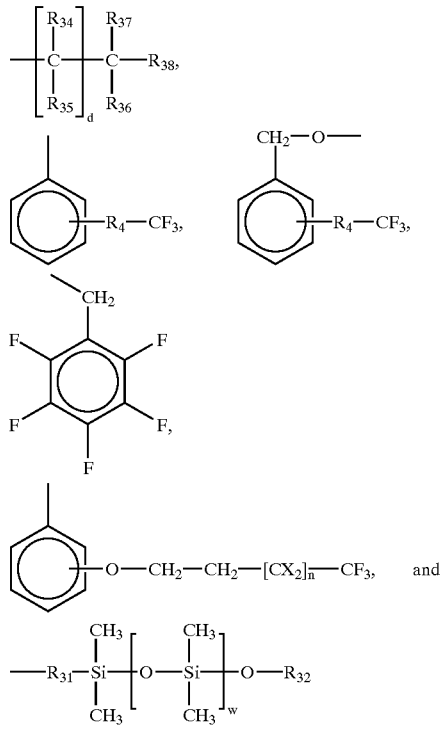

wherein $R_{34}$, $R_{35}$, $R_{36}$, $R_{37}$ and $R_{38}$ are independently selected from the group consisting of H, F and $C_1$ to $C_6$ alkyl; such that at least one occurrence of $R_{34}$, $R_{35}$, $R_{36}$, $R_{37}$ or $R_{38}$ is F; d is an integer from 3 to 19; $R_4$ is selected from the group consisting of $C_1$–$C_4$ alkyl and $C_1$–$C_4$ alkynol; X is selected from the group consisting of H and F; n is an integer from 1 to 10; $R_{31}$ is selected from the group consisting of linear, branched and cyclic $C_2$–$C_{18}$ alkyl and a polyether as described by:

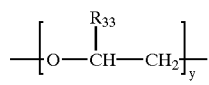

wherein $R_{33}$ is selected from the group consisting of hydrogen, halide and methyl; y is an integer from 1 to 100; $R_{32}$ is selected from the group consisting of H, linear, branched and cyclic $C_2$–$C_{18}$ alkyl and a trimethylsiloxane as described by:

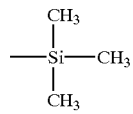

and w is an integer from 0 to 500.

55. The method of claim 53 wherein the calculated Tg value of said third block is at least 20° C. less than the calculated Tg value of said second block.

56. The method claim 53 wherein at least one of said second block and said third block of said flow additive comprises a minor amount of a hydroxy functional radically polymerizable ethylenically unsaturated monomer.

57. The method of claim 51 wherein said controlled radical polymerization method is atom transfer radical polymerization.

58. The method of claim 57 wherein said block copolymeric flow additive is prepared by atom transfer radical polymerization initiated in the presence of an initiator having at least one radically transferable group.

59. The method of claim 58 wherein said block copolymeric flow additive contains a residue of said initiator free of said radically transferable group, and a residue of or derived from said radically transferable group, said initiator being selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable halide.

60. The method of claim 59 wherein said initiator is selected from the group consisting of halomethane, methylenedihalide, haloform, carbon tetrahalide, 1-halo-2,3-epoxypropane, methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, mono-hexakis(α-halo-$C_1$–$C_6$-alkyl)benzene, diethyl-2-halo-2-methyl malonate and mixtures thereof.

61. The method of claim 51 wherein said first block of said block copolymeric flow additive is present in an amount of from 0.01 percent by weight to 5.0 percent by weight, based on the total weight of said block copolymeric flow additive; and said second block of said block copolymeric flow additive is present in an amount of from 95 percent by weight to 99.99 percent by weight, based on the total weight of said block copolymeric flow additive.

62. The method of claim 53 wherein said first block is present in an amount of from 0.01 percent by weight to 5 percent by weight, based on the total weight of said block copolymer; said second block is present in an amount of from 25 percent by weight to 75 percent by weight, based on the total weight of said block copolymer; and said third block is present in an amount of from 20 percent by weight to 74.99 percent by weight, based on the total weight of said block copolymer.

63. The method of claim 53 wherein said block copolymeric flow additive is a di-block copolymeric flow additive comprising said first block and said second block, wherein said first block comprises said first radically polymerizable (meth)acrylate monomer and one or more other radically polymerizable ethylenically unsaturated monomers.

64. The method of claim 63 wherein said other radically polymerizable ethylenically unsaturated monomers are one or more selected from the group consisting of isobornyl (meth)acrylate, n-butyl methacrylate, iso-butyl methacrylate, ethyl methacrylate, iso-decyl(meth)acrylate, lauryl(meth)acrylate, n-octyl(meth)acrylate, 2-ethylhexyl (meth)acrylate, n-butyl acrylate, iso-butyl acrylate, ethyl acrylate and mixtures thereof.

65. The method of claim 63 wherein said first block of said block copolymeric flow additive is present in an amount of from 25 percent by weight to 75 percent by weight, based on the total weight of said block copolymeric flow additive; and said second block of said block copolymeric flow additive is present in an amount of from 25 percent by weight to 75 percent by weight, based on the total weight of said block copolymeric flow additive.

66. The method of claim 53 wherein said block copolymeric flow additive has a number average molecular weight of from 500 to 100,000.

67. The method of claim 55 wherein $R_1$ is hydrogen or methyl, Y is —$(CH_2)_n$—, and n is an integer from 1 to 11.

68. The method of claim 53 wherein said block copolymeric flow additive is present in said thermosetting composition in an amount of from 0.01 percent by weight to 5 percent by weight, based on the total resin solids weight of said thermosetting composition.

69. The method of claim 51 wherein said first reactant having functional groups (i) is selected from carboxylic acid functional polymers, and said second reactant having functional groups (ii) is a beta-hydroxyalkylamide functional crosslinking agent.

70. The method of claim 51 wherein said first reactant having functional groups (i) is selected from hydroxy functional polymers, and said second reactant having functional groups (ii) is a capped isocyanate functional crosslinking agent.

71. The method of claim 51 wherein said first reactant having functional groups (i) is selected from acid functional polyesters and said second reactant having functional groups (ii) is selected from glycidyl isocyanurates and bisphenol A epoxides.

72. The method of claim 51 wherein said first reactant having functional groups (i) is selected from epoxide functional polymers and said second reactant having functional groups (ii) is a carboxylic acid functional crosslinking agent.

73. The method claim 72 wherein said first reactant having functional groups (i) is an epoxide functional (meth)acrylic polymer, and said carboxylic acid functional crosslinking agent (ii) is selected from the group consisting of dodecanedioic acid, azelaic acid, adipic acid, 1,6-hexanedioic acid, succinic acid, pimelic acid, sebacic acid, maleic acid, citric acid, itaconic acid, aconitic acid, carboxylic acid functional crosslinking agents represented by the following general formula:

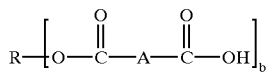

wherein R is the residue of a polyol, A is a divalent linking group having from 2 to 10 carbon atoms, and b is an integer of from 2 to 10, and mixtures of such carboxylic acid functional crosslinking agents.

74. The method of claim 73 wherein said polyol from which R is derived is selected from the group consisting of ethylene glycol, di(ethylene glycol), trimethylolethane, trimethylolpropane, pentaerythritol, di-trimethylolpropane and di-pentaerythritol; A is selected from the group consisting of 1,2-cyclohexylene and 4-methyl-1,2-cyclohexylene; and b is an integer of from 2 to 6.

75. A substrate coated by the method of claim 53.

* * * * *